US010045394B2

(12) United States Patent
Vajapeyam et al.

(10) Patent No.: US 10,045,394 B2
(45) Date of Patent: Aug. 7, 2018

(54) TECHNIQUES FOR PAGING IN EXTENDED DISCONTINUOUS RECEPTION

(71) Applicant: QUALCOMM Incorporated, San Diego, CA (US)

(72) Inventors: Madhavan Srinivasan Vajapeyam, San Diego, CA (US); Miguel Griot, La Jolla, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 15/077,855

(22) Filed: Mar. 22, 2016

(65) Prior Publication Data

US 2016/0330791 A1    Nov. 10, 2016

Related U.S. Application Data

(60) Provisional application No. 62/208,511, filed on Aug. 21, 2015, provisional application No. 62/161,140, (Continued)

(51) Int. Cl.
*H04W 76/28*   (2018.01)
*H04W 68/00*   (2009.01)
(Continued)

(52) U.S. Cl.
CPC ....... *H04W 76/28* (2018.02); *H04W 56/0015* (2013.01); *H04W 68/005* (2013.01);
(Continued)

(58) Field of Classification Search
CPC ........... H04W 56/0015; H04W 68/005; H04W 72/005; H04W 72/0446; H04W 72/085; H04W 76/048
See application file for complete search history.

(56) References Cited

U.S. PATENT DOCUMENTS

2009/0093262 A1* 4/2009 Gao .................. H04W 68/00
                                                     455/458
2009/0270114 A1* 10/2009 Harris ............... H04W 68/10
                                                     455/458
(Continued)

FOREIGN PATENT DOCUMENTS

EP          2234420 A1      9/2010
WO    WO 2014071551 A1 *   5/2014    ............ H04W 68/02
(Continued)

OTHER PUBLICATIONS

International Search Report for PCT/US2016/023685; dated May 13, 2016; ISA/EPO.*

*Primary Examiner* — Benjamin H Elliott, IV
(74) *Attorney, Agent, or Firm* — Patterson & Sheridan, LLP

(57) ABSTRACT

Aspects of the present disclosure provide techniques that may be used wireless network communication devices to support devices operating with extended discontinuous reception (eDRX). An exemplary method, performed by a BS, generally includes determining at least one paging hyper-frame for paging a user equipment (UE) based on an identification (ID) of the UE, the paging hyper-frame determined from a set of periodically occurring hyper-frames that each span a number of radio frames, receiving a request to page the UE, and transmitting a paging signal to the UE in at least one subframe within a radio frame of the paging hyper-frame. Another exemplary method, performed by a UE, generally includes determining at least one paging hyper-frame for monitoring for a paging signal from a base station (BS) based on an identification (ID) of the UE, the paging hyper-frame determined from a set of periodically occurring hyper-frames that each span a number of radio (Continued)

frames, and monitoring for the paging signal in at least one subframe within a radio frame of the paging hyper-frame.

50 Claims, 14 Drawing Sheets

Related U.S. Application Data filed on May 13, 2015, provisional application No. 62/157,418, filed on May 5, 2015, provisional application No. 62/156,877, filed on May 4, 2015.

(51) Int. Cl.
    *H04W 72/04*     (2009.01)
    *H04W 72/00*     (2009.01)
    *H04W 56/00*     (2009.01)
    *H04W 72/08*     (2009.01)

(52) U.S. Cl.
    CPC ..... *H04W 72/005* (2013.01); *H04W 72/0446* (2013.01); *H04W 72/085* (2013.01)

(56) References Cited

U.S. PATENT DOCUMENTS

| | | | | |
|---|---|---|---|---|
| 2010/0220680 A1* | 9/2010 | Ramankutty | ......... | H04W 68/08 370/329 |
| 2011/0105155 A1* | 5/2011 | Bienas | ................. | H04W 68/02 455/458 |
| 2011/0130100 A1* | 6/2011 | Chen | ..................... | H04W 24/00 455/67.11 |
| 2011/0261715 A1* | 10/2011 | Norefors | ............... | H04W 60/00 370/252 |
| 2012/0134318 A1* | 5/2012 | Park | ...................... | H04W 68/00 370/315 |
| 2013/0301501 A1 | 11/2013 | Olvera-Hernandez et al. | | |
| 2014/0004858 A1* | 1/2014 | Park | ...................... | H04W 68/00 455/435.1 |
| 2015/0173039 A1* | 6/2015 | Rune | ................. | H04W 52/0216 370/311 |
| 2015/0237577 A1* | 8/2015 | Zhang | ............... | H04W 52/0216 370/311 |
| 2016/0249404 A1* | 8/2016 | Hoglund | ........... | H04W 52/0216 |
| 2016/0286385 A1* | 9/2016 | Ryu | ...................... | H04W 68/02 |
| 2016/0295504 A1* | 10/2016 | Wang | .................... | H04W 52/02 |
| 2016/0330791 A1* | 11/2016 | Vajapeyam | ......... | H04W 76/048 |

FOREIGN PATENT DOCUMENTS

| | | |
|---|---|---|
| WO | WO-2014090294 A1 | 6/2014 |
| WO | WO-2015019727 A1 | 2/2015 |
| WO | WO-2015021643 A1 | 2/2015 |
| WO | WO-2016022651 A1 | 2/2016 |

* cited by examiner

TECHNIQUES FOR PAGING IN EXTENDED DISCONTINUOUS RECEPTION

CROSS-REFERENCE TO RELATED APPLICATIONS

The present application for patent claims priority to U.S. Provisional Patent Application No. 62/156,877, filed May 4, 2015, U.S. Provisional Patent Application No. 62/157,418, filed May 5, 2015, U.S. Provisional Patent Application No. 62/161,140, filed May 13, 2015, and U.S. Provisional Patent Application No. 62/208,511, filed Aug. 21, 2015, all of which are assigned to the assignee of the present application and hereby expressly incorporated by reference herein in their entirety.

FIELD OF THE INVENTION

Certain aspects of the present disclosure generally relate to wireless communications and, more particularly, to techniques for paging devices operating with extended discontinuous reception (eDRX).

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, gaming devices, navigation devices, virtual reality devices, wearable devices (e.g., smart glasses/goggles/heads-up displays, smart watch, smart wristband), etc. Some UEs may be considered machine-type communication (MTC) UEs, which may include remote devices, such as sensors, meters, monitors, location tags, drones, trackers, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To improve performance of devices with infrequent communications, techniques for extended discontinuous reception are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (BS). The method generally includes determining at least one paging hyper-frame for paging a user equipment (UE) based on an identification (ID) of the UE, the paging hyper-frame determined from a set of periodically occurring hyper-frames that each span a number of radio frames, receiving a request to page the UE, and transmitting a paging signal to the UE in at least one subframe within a radio frame of the paging hyper-frame.

Certain aspects of the present disclosure provide a method for wireless communications by a user equipment (UE). The method generally includes determining at least one paging hyper-frame for monitoring for a paging signal from a base station (BS) based on an identification (ID) of the UE, the paging hyper-frame determined from a set of periodically occurring hyper-frames that each span a number of radio frames, and monitoring for the paging signal in at least one subframe within a radio frame of the paging hyper-frame.

Certain aspects of the present disclosure provide a method for wireless communications by a network entity. The method generally includes determining at least one paging hyper-frame for paging a user equipment (UE) based on an identification (ID) of the UE, the paging hyper-frame determined from a set of periodically occurring hyper-frames that each span a number of radio frames, and requesting one or more base stations (BSs) to page the UE differently upon occurrence of the paging hyper-frame than at other times.

Certain aspects of the present disclosure provide an apparatus for wireless communications. The apparatus generally includes means for determining at least one paging hyper-frame for paging a user equipment (UE) based on an identification (ID) of the UE, the paging hyper-frame determined from a set of periodically occurring hyper-frames that each span a number of radio frames, means for receiving a request to page the UE, and means for transmitting a paging signal to the UE in at least one subframe within a radio frame of the paging hyper-frame.

Certain aspects of the present disclosure provide an apparatus for wireless communications. The apparatus generally includes means for determining at least one paging hyper-frame for monitoring for a paging signal from a base station (BS) based on an identification (ID) of a UE, the paging hyper-frame determined from a set of periodically occurring hyper-frames that each span a number of radio frames, and means for monitoring for the paging signal in at least one subframe within a radio frame of the paging hyper-frame.

Certain aspects of the present disclosure provide an apparatus for wireless communications. The apparatus generally includes means for determining at least one paging hyper-frame for paging a user equipment (UE) based on an identification (ID) of the UE, the paging hyper-frame determined from a set of periodically occurring hyper-frames that each span a number of radio frames, and means for requesting one or more base stations (BSs) to page the UE differently upon occurrence of the paging hyper-frame than at other times.

Certain aspects of the present disclosure provide a base station (BS). The BS generally includes at least one antenna and at least one processor configured to determine at least one paging hyper-frame for paging a user equipment (UE) based on an identification (ID) of the UE, the paging hyper-frame determined from a set of periodically occurring hyper-frames that each span a number of radio frames, to receive a request to page the UE, and to transmit a paging signal to the UE in at least one subframe within a radio frame of the paging hyper-frame.

Certain aspects of the present disclosure provide a user equipment (UE). The UE generally includes at least one antenna and at least one processor configured to determine at least one paging hyper-frame for monitoring for a paging signal from a base station (BS) based on an identification (ID) of the UE, the paging hyper-frame determined from a set of periodically occurring hyper-frames that each span a number of radio frames, and to monitor for the paging signal in at least one subframe within a radio frame of the paging hyper-frame.

Certain aspects of the present disclosure provide a network entity. The network entity generally includes at least one network interface and a processor configured to determine at least one paging hyper-frame for paging a user equipment (UE) based on an identification (ID) of the UE, the paging hyper-frame determined from a set of periodically occurring hyper-frames that each span a number of radio frames, and to request one or more base stations (BSs) to page the UE differently upon occurrence of the paging hyper-frame than at other times.

Certain aspects of the present disclosure provide a computer readable medium. The computer readable medium generally includes instructions for determining at least one paging hyper-frame for paging a user equipment (UE) based on an identification (ID) of the UE, the paging hyper-frame determined from a set of periodically occurring hyper-frames that each span a number of radio frames, instructions for receiving a request to page the UE, and instructions for transmitting a paging signal to the UE in at least one subframe within a radio frame of the paging hyper-frame.

Certain aspects of the present disclosure provide a computer readable medium. The computer readable medium generally includes instructions for determining at least one paging hyper-frame for monitoring for a paging signal from a base station (BS) based on an identification (ID) of a UE, the paging hyper-frame determined from a set of periodically occurring hyper-frames that each span a number of radio frames, and instructions for monitoring for the paging signal in at least one subframe within a radio frame of the paging hyper-frame.

Certain aspects of the present disclosure provide a computer readable medium. The computer readable medium generally includes instructions for determining at least one paging hyper-frame for paging a user equipment (UE) based on an identification (ID) of the UE, the paging hyper-frame determined from a set of periodically occurring hyper-frames that each span a number of radio frames, and instructions for requesting one or more base stations (BSs) to page the UE differently upon occurrence of the paging hyper-frame than at other times.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide various techniques for extended discontinuous reception (eDRX). eDRX is one of the enhancements to be introduced in long term evolution (LTE) release 13 (Rel 13). eDRX may enable significantly higher power savings than what is possible in current DRX, especially for machine type communications (MTC) devices with low data activity. Legacy (e.g., current) DRX is constrained to the system frame number (SFN) range, which is currently 0 to 1023 in LTE. In current DRX, the maximum length of a DRX cycle is 2.56 seconds, which means a device must "wake up" (e.g., activate a receiver) at least once every 2.56 seconds. According to aspects of the present disclosure, devices (e.g., user equipments (UEs), base stations (BSs) and other network entities) may operate to enable devices to perform eDRX while not being constrained by the SFN range. For example, as will be described in detail below, the techniques may be used by certain devices, such as MTC devices and/or enhanced MTC (eMTC) devices, to perform eDRX with cycle lengths of forty minutes or more, rather than being constrained to a maximum cycle length of 2.56 seconds based on the SFN range, as in current DRX.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
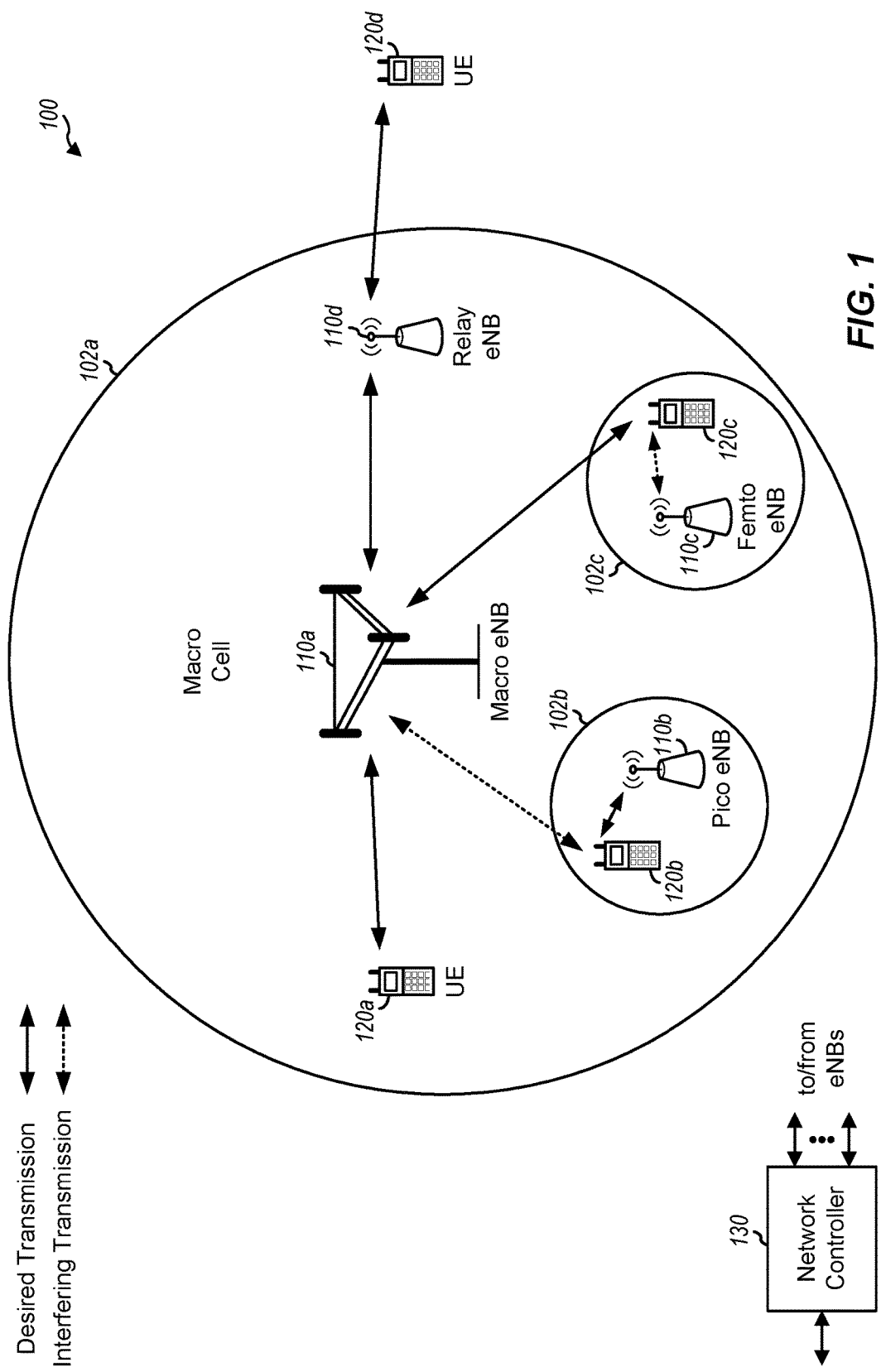
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, one or more signals used for searching for a cell and acquiring a cell may be transmitted by one or more BSs in the wireless communication network 100 to one or more UEs in the wireless communication network 100. As will be described in more detail below, the techniques presented herein may be used by the BS(s) and/or UE(s) to reduce the amount of time associated with (UEs) performing cell acquisition based on the one or more signals. As used herein, the term "cell acquisition" may be used to refer to searching for a cell and/or acquiring the cell (e.g., synchronizing to the cell).

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a network interface to a backhaul. The eNBs may also communicate with one another, e.g., directly or indirectly via network interfaces to a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Examples of UEs may include a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, in LTE Rel-12, when compared to legacy and/or advanced UEs in the LTE network, the LC UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the LC UEs may have a relaxed switching timing from transmit to receive (or from receive to transmit) operations. For example, in one case, compared to a switching timing of 20 microseconds (us) for legacy and/or advanced UEs, the LC UEs may have a relaxed switching timing of 1 millisecond (ms).

In some cases, the LC UEs (e.g., in LTE Rel-12) may also be able to monitor downlink (DL) control channels in the same way as legacy and/or advanced UEs in the LTE network monitor DL control channels. Release 12 MTC UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

The wireless communication network 100, as an alternative or in addition to supporting MTC operation, may support additional MTC enhancements (e.g., eMTC operations). For example, LC eMTC UEs (e.g., in LTE Rel-13) may be able to support narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). The LC eMTC UE may also be able to support one or more coverage modes of operation. For example, the LC eMTC UE may be able to support coverage enhancements up to 15 dB.

As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

In some cases, a UE (e.g., LC UE or non-LC UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
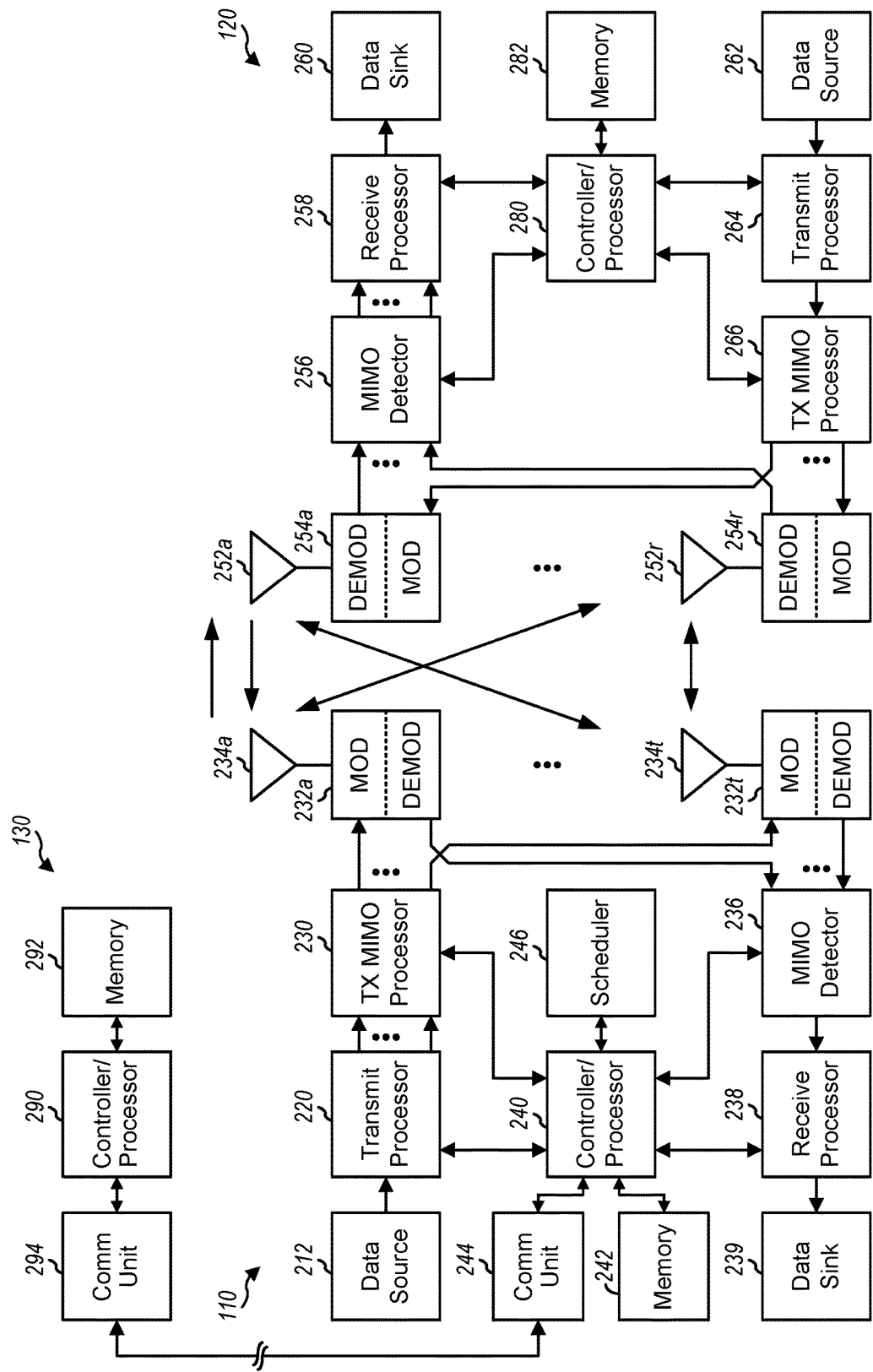
FIG. 2 shows a block diagram conceptually illustrating an example of a base station in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 900 illustrated in FIG. 9 and/or other processes for the techniques described herein. Similarly, controller/processor 280 and/or other processors and modules at UE 120 may perform or direct operations 1000 illustrated in FIG. 10 and/or processes for the techniques described herein. Memories 242 and 282 may store data and program codes for BS 110 and UE 120, respectively. A scheduler 246 may schedule UEs for data transmission on the downlink and/or uplink.

Figure 3:
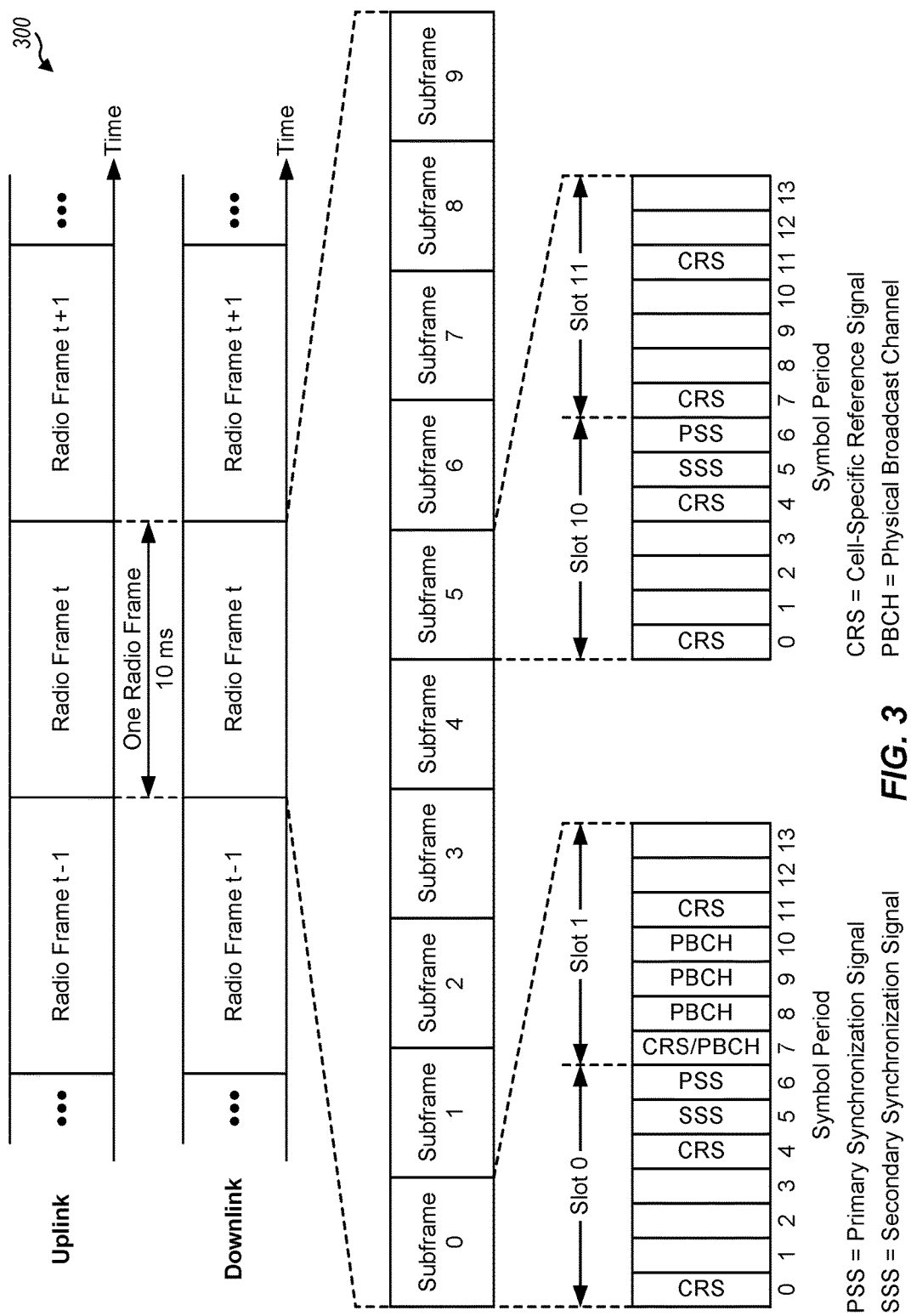
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. For example, the PSS may provide the UE with information regarding the physical layer identity (e.g., 0 to 2), which may identify which of three groups of physical layer cell identifies a LTE cell may belong. The PSS may also be used by the UE in symbol timing detection, frequency offset detection, etc. The SSS may provide the UE with information regarding the physical layer cell identity group number (e.g., 0 to 167) and may be used by the UE for radio frame timing detection, cyclic prefix length detection, time division duplexing (TDD)/frequency division duplexing (FDD) detection, etc.

With the physical layer identity (e.g., from PSS) and the physical layer cell identity group number (e.g., from SSS), the UE may determine the physical layer cell identify (PCI) for a given cell. Once the UE knows the PCI for a given cell, as described below, the UE may know the location of reference signals transmitted from the cell and may be able to receive and decode system information (e.g., used for acquiring the cell) transmitted from the cell.

The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry some system information (e.g., the master information block (MIB)) that, in general, may be used by UEs for initial access to the cell, and the like. For example, the PBCH may carry information regarding system bandwidth, number of transmit antennas, system frame number, etc. The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
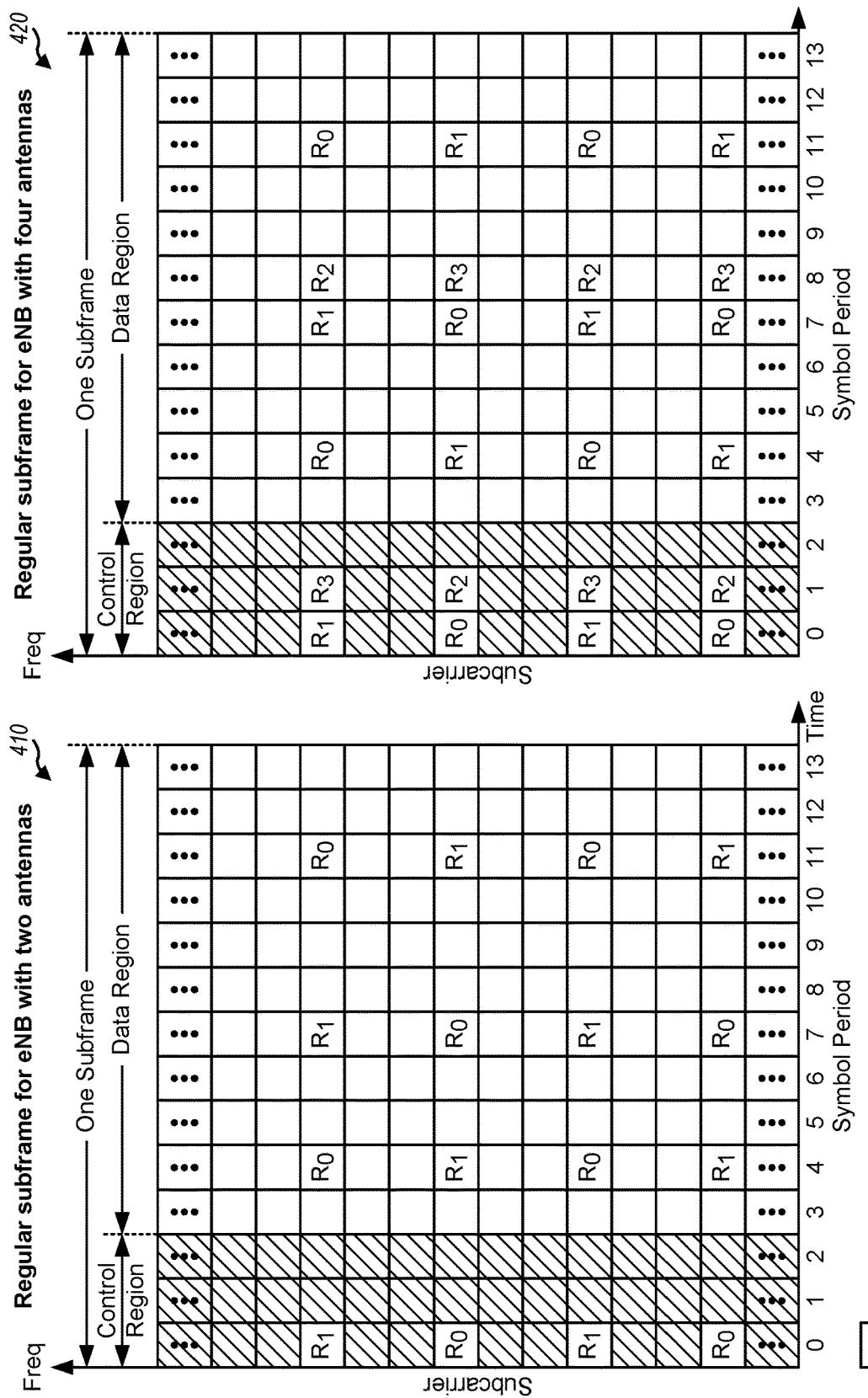
FIG. 4 is a block diagram conceptually illustrating two exemplary subframe formats with the normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network. For example, as noted above, the LC UE may be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. Further, in some cases, non-LC UEs may also be able to support the CE mode.

Example Paging in Extended Discontinuous Reception

As mentioned above, one or more techniques presented herein may be used by one or more BSs, network devices, and UEs (e.g., MTC UEs) in performing extended discontinuous reception (eDRX). The one or more techniques presented herein may improve reliability of paging operations for UEs performing eDRX. The one or more techniques may also improve utilization of transmission resources in a wireless communication network, for example, by preventing unnecessary repetition of paging signals to a UE.

In legacy DRX, each eNB assigns a paging occasion to a device independent of the paging occasion that another eNB assigns to that device. Thus, a device operating using legacy DRX that relocates to a new cell may be assigned a new paging occasion by the new cell. The assignment of the new paging occasion may cause a UE to miss pages from the network for several DRX cycles. For example, a network may determine to page a UE and send page commands to all of the eNBs serving the tracking area where the UE was last located. Still in the example, the UE may leave a first cell served by a first eNB before the paging occasion for the UE in the first cell, and the UE may arrive in a second cell served by a second eNB after the paging occasion for the UE in the second cell. Thus, the UE misses pages for more than one DRX cycle in the example just due to the UE's movement, and the UE can miss pages for more DRX cycles if the UE moves into a third cell. Because the longest legacy DRX cycle is 2.56 seconds, a device operating using legacy DRX may miss pages for several seconds due to the device relocating.

As mentioned above, eDRX may allow a UE to be in a sleep mode, wherein receivers and other systems of the UE are inactive and unpowered, for cycles lasting several (e.g., as many as forty) minutes. If a UE is inactive for several minutes between active periods, the importance of reliability of paging the UE is increased, as the opportunities for paging the UE occur infrequently compared to legacy devices.

When a UE is operating in eDRX, the UE may relocate to a different cell while the UE is inactive. For example, an MTC UE may be carried in an automobile (e.g., as part of a system to gather data on the operation of the automobile), and the automobile may be driven from a cell to another cell while the MTC UE is in a sleep cycle. An MTC UE operating in eDRX may traverse several cells while in a sleep mode without being in contact with any of the traversed cells. As described above, a UE operating in legacy DRX may miss pages for several DRX cycles when the UE relocated to a new cell. If an MTC UE operating in eDRX is assigned a new paging opportunity by each eNB that serves a cell in which the MTC UE is located (e.g., similar to legacy DRX), then the MTC UE may miss pages for several eDRX cycles. However, a device operating using eDRX that relocates to a new cell and misses pages for several eDRX cycles may not be reachable by the network for an hour or more. Aspects of the present disclosure provide techniques that may prevent a device operating using eDRX from missing pages for several eDRX cycles when relocating.

According to aspects of the present disclosure, a wireless communication system may index each cycle of 1024 radio frames (e.g., an SFN cycle) with a hyper SFN (H-SFN). The H-SFN may, for example, have a range of 0 through 255 (e.g., the range of eight-bit binary numbers). eNBs of a wireless communication system may broadcast the H-SFN in a system information block (SIB).

According to aspects of the present disclosure, a wireless communication system may assign one or more paging hyper-frames (PHs) to a UE operating using eDRX. The wireless communication system may assign an eDRX period (e.g., T-eDRX) to a device operating using eDRX, and the device and wireless communication system may determine PHs of the device based on an assigned PH and the eDRX period assigned to the device.

Figure 5:
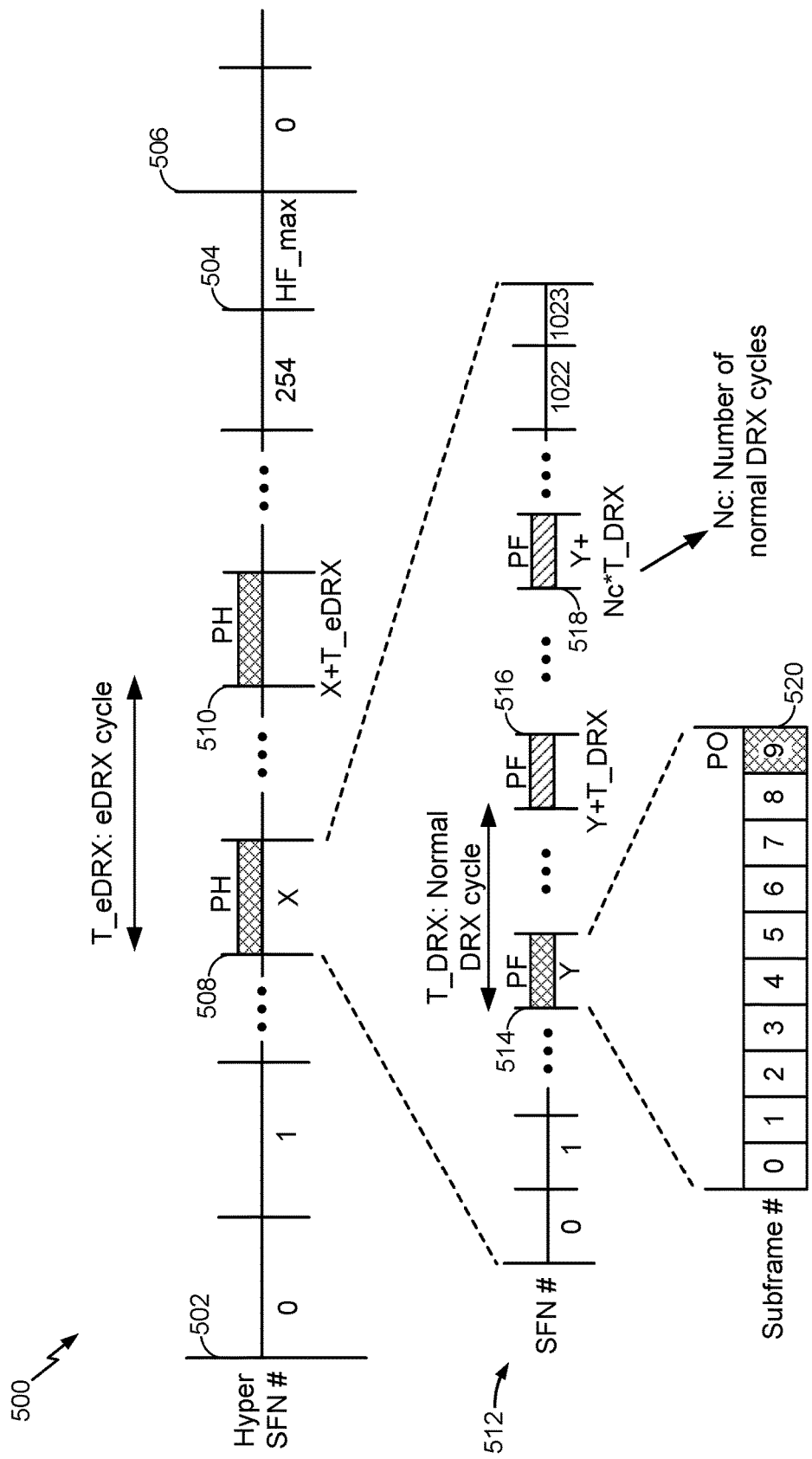
FIG. 5 illustrates an exemplary timeline for eDRX, in accordance with certain aspects of the present disclosure.

FIG. 5 illustrates an exemplary timeline 500 for eDRX. In the exemplary timeline, an H-SFN for a BS (e.g., eNB 110a shown in FIG. 1) starts at 0 at 502, and increases up to a maximum value (e.g., 255) at 504. At 506, the H-SFN starts over at 0 again. A first PH for a device is illustrated at 508. A second PH for a device occurs T_eDRX later, at 510. The frames included in the first PH are illustrated at 512. Each hyper-frame includes 1024 frames, with SFNs ranging from 0 through 1023. As illustrated, each PH includes one or more paging frames (PFs) 514, 516, 518. The PFs are determined according to legacy standards for DRX, such as 3GPP TS 36.321. As illustrated, the first PF 514 in a PH occurs at SFN Y, which is assigned by the eNB serving the UE, and $N_c$ additional PFs 516, 518 occur at intervals of the normal DRX cycle length (e.g., T_DRX), according to the legacy (e.g., normal) DRX cycle. $N_c$ is a number of DRX cycles after a first PF that a UE is to monitor for pages during one PH, and may, for example, be configured on the UE by a serving eNB of the UE when the eNB is configuring the UE to perform eDRX. During each PF, at least one paging opportunity (PO) 520 occurs in at least one subframe.

The normal DRX cycle length, T_DRX, may be configured on a UE by a BS using non-access stratum (NAS) or radio resource control (RRC) signaling. Additionally or alternatively, a UE can be configured with a timer of duration $T_c$. A UE configured with such a timer wakes up (e.g., activates a receiver) at the beginning of the first PF and remains active until the expiration of the timer.

In order to improve the reliability of paging of a UE operating with eDRX, a network entity (e.g., a mobility management entity (MME)) may trigger multiple page transmissions by an eNB when the network entity determines to page the UE. As illustrated in FIG. 5, a network entity may trigger an eNB to page a UE at PFs Y, Y+T_DRX, and Y+2T_DRX, etc.

According to aspects of the present disclosure, a UE operating with eDRX may decide to monitor only a subset of the $N_c$ PFs during a DRX cycle. For example, a UE may monitor the first PF of $N_c$ PFs during a DRX cycle, and if the UE does not receive a page, then the UE decides to return to sleep mode and not monitor other PFs of the DRX cycle. The UE may decide to not monitor PFs based on obtaining an indication that the UE's serving cell will not page the UE during the PFs that the UE will not monitor. For example, a UE may determine a signal quality metric (e.g., measure a signal to noise ratio) of the UE's serving cell when the UE wakes up during a PH. In the example, the UE determines that the signal quality metric indicates that the UE is in a position where the UE can receive signals from the cell without difficulty, and the UE did not receive a page. Still in the example, because the eNB is informed that the UE is operating with eDRX, the eNB will page the UE during each of the PFs during a PH. Still in the example, the UE is programmed to return to sleep mode after the first PF if the UE does not detect a page when the signal quality metric of the cell is better than or equal to a threshold value, because if the eNB is paging the UE, the UE will have detected the page in the first PF (due to the good signal quality).

According to aspects of the present disclosure, a UE may consider whether the UE has recently selected or reselected to a new cell when deciding whether to monitor a subset of the $N_c$ PFs during a DRX cycle. If a UE has recently selected or reselected to a new cell, then the UE may have recently moved to a new location and may still be in motion. The UE may decide to monitor more than one of the $N_c$ PFs during a DRX cycle if the UE has recently selected or reselected to a new cell, because the mobility of the UE may cause the UE to miss a page (e.g., due to transient interference related to the mobility of the UE) while the measured signal quality metric is better than the threshold value, as described above.

According to aspects of the present disclosure, a network entity (e.g., an MME) triggering multiple page transmissions from one or more eNBs to a UE may cancel some page transmissions, if the paged UE contacts the network entity before all of the page transmissions have been transmitted.

According to aspects of the present disclosure, a UE operating with eDRX determines the system information modification boundary based on the eDRX cycle, whether the UE is paged on the eDRX PF or the legacy PF (e.g., if the UE awakens because the UE has data to transmit and receives a page during a legacy PF). A system information modification boundary determines a time period that a UE remains active and listening to broadcasts from a serving cell in order to receive updates to the system information of the cell. A UE operating with eDRX computes the system information modification boundary for the cell based on the eDRX cycle, and does not compute a system information modification boundary based on a legacy DRX cycle, even if the UE receives a legacy DRX page.

According to aspects of the present disclosure, eNBs within a tracking area may roughly align their H-SFN indices with each other. The eNBs may align their H-SFN indices with each other by each eNB initializing their H-SFN index at a particular time of day, as defined by a global clock, or other time reference. By roughly aligning the H-SFN indices within a tracking area, paging of a UE operating with eDRX may be more predictable, as all of the eNBs should transmit pages (e.g., pages requested by an MME) to a UE within a short (e.g., twice the length of a hyper-frame) period of time of each other. In addition, rough alignment of the H-SFN indices of eNBs in a tracking area allows a network entity to delay issuing a paging request for a UE until near the beginning of the PH for the UE.

Figure 6:
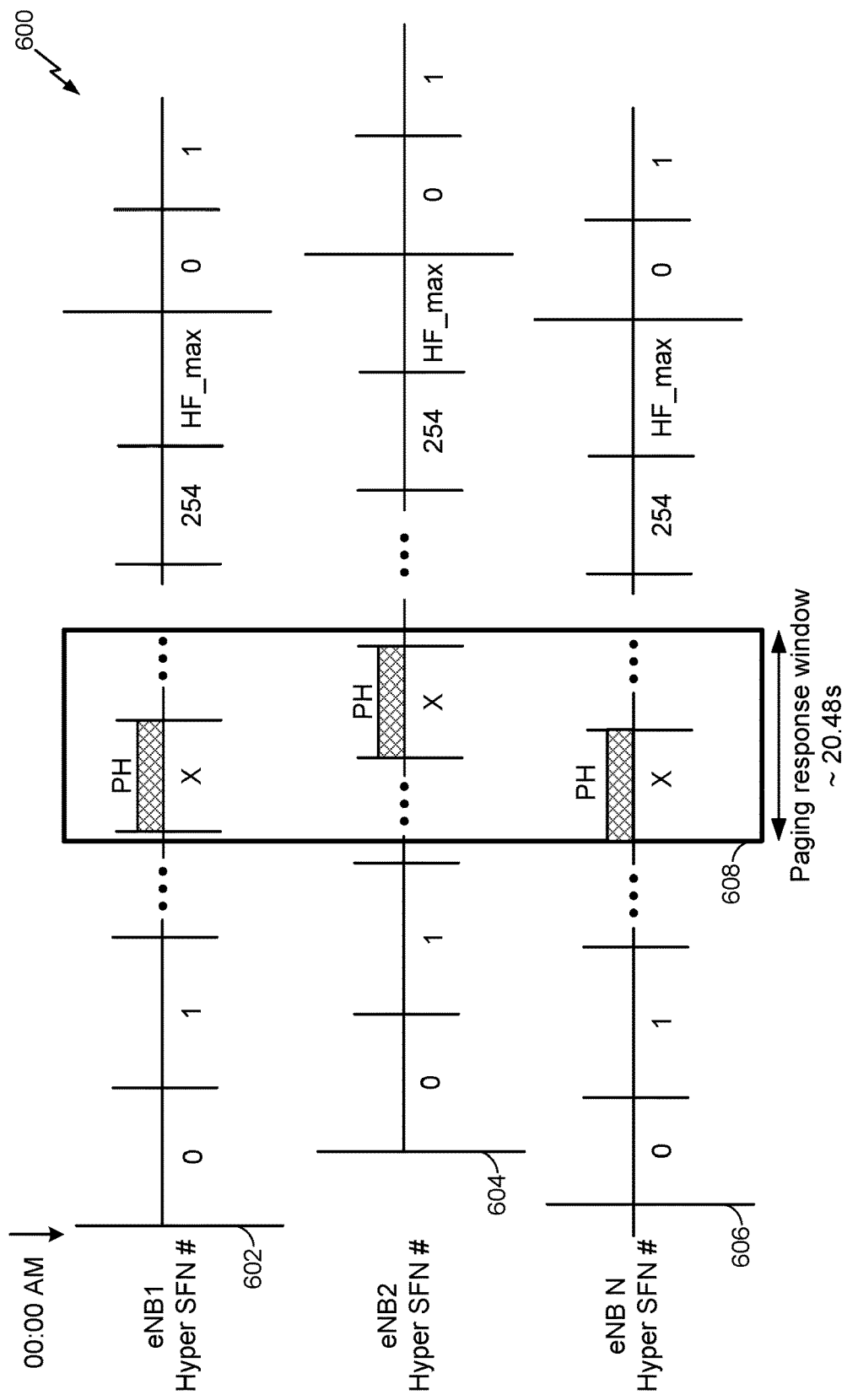
FIG. 6 illustrates exemplary timelines of eNBs supporting UEs operating with eDRX, in accordance with certain aspects of the present disclosure.

FIG. 6 illustrates exemplary timelines 600, of eNBs located within one tracking area. As illustrated, eNB1 initializes its H-SFN index at time 602. eNB3 initializes its H-SFN index slightly later at time 606, and eNB2 initializes its H-SFN index later still at time 604. Each of the eNBs initializes their H-SFN indices at the beginning of the first frame with SFN index 0 occurring after midnight (00:00 AM) local time. Because each eNB initializes its H-SFN index at nearly the same time, the PH X for a particular UE occurs in all three eNBs within a short window, referred to as a paging response window 608. The paging response window has a length equal to twice the length of a hyper-frame, because all of the eNBs initialize their H-SFN indices at roughly the same time.

According to aspects of the present disclosure, a network entity (e.g., an MME) may improve the network entity's paging strategy, based on the occurrence of paging hyper-frames for a UE. For example, a network entity may delay issuing pages for a particular UE until shortly (e.g., less than twenty milliseconds) before the beginning of a paging response window for the UE. As a second example of improving a paging strategy, a network entity may wait until occurrence of a paging response window for a UE before requesting a page retransmission to the UE when the UE does not respond to a page. In a third example of improving a paging strategy, a network entity may perform more frequent paging during a paging response window of a UE, and less frequent paging outside the paging response window of the UE. That is, a network entity may perform legacy-type paging, wherein the network entity waits for the end of a DRX cycle of a UE before issuing a paging retransmission request for the UE, outside of the paging response window for the UE, and the network may perform more frequent paging, wherein the network entity waits for less than the length of a DRX cycle before issuing a paging retransmission request for the UE, inside the paging response window for the UE.

Figure 7:
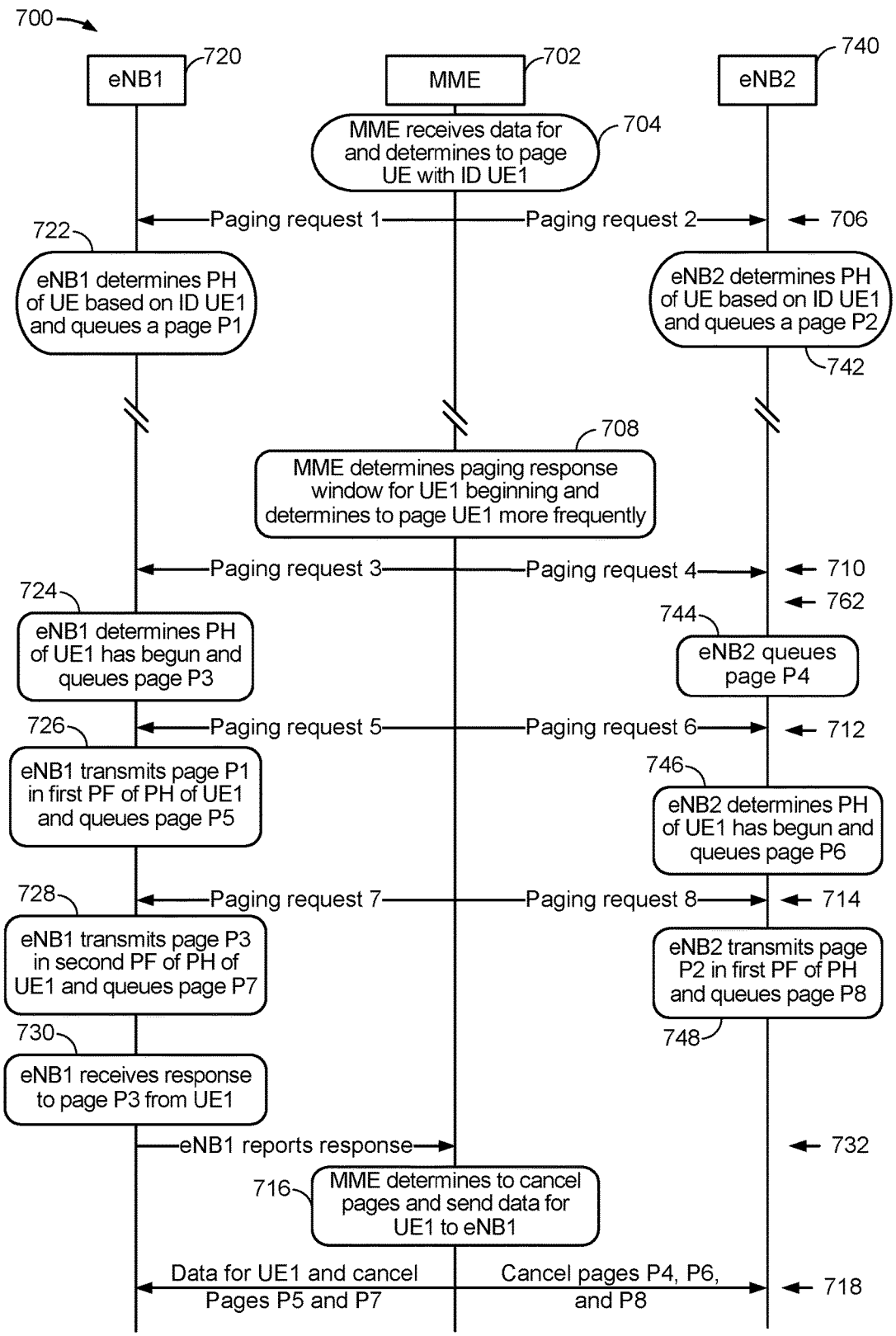
FIG. 7 illustrates an exemplary timeline of a mobility management entity (MME) and eNBs operating with eDRX, in accordance with certain aspects of the present disclosure.

FIG. 7 is an exemplary call flow 700 of an MME 702, an eNB1 720, and an eNB2 740 acting to communicate with a UE operating with eDRX, according to aspects of the present disclosure. The two eNBs 720, 740 may both be in a single tracking area T. While the exemplary call flow is illustrated with an MME 702, other types of network controllers (e.g., network controller 130 shown in FIG. 1) may perform similar operations, according to aspects of the present disclosure. Also, while the exemplary call flow is illustrated with two eNBs 720, 740, other numbers of eNBs may be involved in communicating with a UE operating with eDRX. eNB 110a shown in FIG. 1 may be an example of an eNB that may perform as shown in the exemplary call flow. eNB1 720 may operate according to the timeline beginning at 602 shown in FIG. 6, and similarly eNB2 740 may operate according to the timeline beginning at 604 shown in FIG. 6.

At 704, the MME 702 receives data for a UE with identification (ID) UE1 (not shown) and determines to page UE1. The MME 702 may determine that UE1 is operating with eDRX and is located within a tracking area T as part of determining to page UE1. The MME 702 may determine that UE1 is operating with eDRX and is located within tracking area T by referring to a database of UEs served by the network.

At time 706, the MME 702 sends a paging request (i.e., paging request 1 and paging request 2) to page UE1 to each of the eNBs serving cells within tracking area T. In the exemplary call flow, two eNBs, eNB1 720 and eNB2 740 serve tracking area T. The paging requests (i.e., paging request 1 and paging request 2) include the ID (UE1) of the UE to be paged.

At 722, eNB1 720 receives paging request 1, and determines when the paging hyper-frame (PH) for UE1 will begin, based on the ID of UE1. At 722, eNB1 720 determines that a PH for UE1 is not currently occurring, and queues a page P1 for UE1 in response to paging request 1. Similarly, at 742, eNB2 740 receives paging request 2, determines when the PH for UE1 will begin based on the ID of UE1, determines that a PH for UE1 is not currently occurring, and queues a page P2 for UE1.

After some time has passed, at 708 the MME 702 determines that a paging response window for UE1, such as the paging response window beginning at 608 in FIG. 6, is beginning. As described above, the MME 702 may determine to perform more frequent paging of UE1 during the paging response window for UE1. For example, UE1 may operate with a normal DRX cycle length of 64 frames (e.g., 0.64 seconds), for example, during a paging hyper-frame (see, e.g., FIG. 5), and the MME 702 may determine to send a paging request for UE1 twice per each normal DRX cycle length (e.g., once per 32 frames), instead of sending a paging request for UE1 and waiting for the length of the DRX cycle (64 frames) before sending a next paging request for UE1. At time 710, the MME 702 sends paging request 3 to eNB1 720 and paging request 4 to eNB2 740.

At 724, eNB1 720 determines that a PH for UE1 begins at time 762. eNB1 720 also queues a page P3 for UE1 in response to paging request 3. Similarly, at 744, eNB2 740 queues a page P4 for UE1 in response to paging request 4.

At time 712, the MME 702 sends paging request 5 to eNB1 720 and paging request 6 to eNB2 740, according to the earlier determination (at 708) to perform more frequent paging of UE1 during the paging response window for UE1.

eNB1 720 transmits the page P1 during a first paging frame (PF) of the PH of UE1 at 726. eNB1 720 also queues page P5 for UE1 in response to receiving paging request 5.

At 746, eNB2 740 determines that a PH for UE1 has begun. eNB2 740 also queues page P6 in response to receiving paging request 6. The PH of UE1 in a cell served by eNB2 may start at a different time than the PH of UE1 in a cell served by eNB1 because the times at which each eNB starts counting hyper-frames from H-SFN 0 may vary, as shown in timelines 600 in FIG. 6.

At time 714, the MME 702 sends paging request 7 to eNB1 720 and paging request 8 to eNB2 740, according to the earlier determination (at 708) to perform more frequent paging of UE1 during the paging response window for UE1.

At 728, eNB1 720 transmits page P3 in a second PF of the PH for UE1. eNB1 720 also queues page P7 for UE1 in response to receiving paging request 7.

At 748, eNB2 740 transmits page P2 in a first PF of the PH of UE1. The first PF of the PH of UE1 in the cell served by eNB2 740 may occur at a different time than the first PF of the PH of UE1 in the cell served by eNB1 720 (see 726, above) because the times at which each eNB starts counting hyper-frames from H-SFN 0 may vary, as shown in timelines 600 in FIG. 6.

At 730, eNB1 720 receives a response to page P3 from UE1. eNB1 720 reports the response to the MME 702 shortly thereafter, at time 732.

At 716, in response to receiving the report of the response of UE1 from eNB1 720, the MME 702 may determine to cancel pages for UE1 and to send the data for UE1 to eNB1 720 for delivery to UE1. At 718, the MME 702 may send the data for UE1 and commands to cancel pages P5 and P7 to eNB1 720. Also at 718, the MME 702 may send commands to cancel pages P4, P6, and P8 to eNB2 740.

According to aspects of the present disclosure, an eNB may determine to transmit system information updates based on system information modification boundaries of UEs served by the eNB. As mentioned above, UEs operating with eDRX may determine their system information modification boundaries based on the eDRX cycle assigned to the UEs. An eNB may determine to perform and transmit system information modifications based on when served UEs will be in paging response windows, so the eNB can page the UEs and wake the UEs up to receive the system information modifications. According to aspects of the present disclosure, the system information modification period boundaries are defined by SFN values for which SFN mod m=0, where m is the number of radio frames comprising the modification period.

When eDRX UEs and normal (e.g., legacy) DRX UEs are camped on a cell, the default DRX cycles of the eDRX UEs and normal DRX UEs are different. According to aspects of the present disclosure, a separate broadcast control channel (BCCH) modification period may be broadcast for eDRX UEs. A first technique for broadcasting a separate BCCH modification period for eDRX UEs is for an eNB to signal separate values for eDRX UEs. The separate values may comprise a modification time period, T_mod_eDRX, and a number of modification time periods, K_eDRX, to remain awake to receive system modifications via BCCH. Then the BCCH modification time period for eDRX may be computed (e.g., by a UE and/or an eNB) as BCCH_modif_period=T_mod_eDRX·K_eDRX.

A second technique for broadcasting a separate BCCH modification period for eDRX UEs is for an eNB to signal a new parameter C_eDRX to modify the normal DRX parameters T_mod and K. Then the BCCH modification time period for eDRX may be computed (e.g., by a UE and/or an eNB) as BCCH_modif_period=C_eDRX·(T_mod·K)

e.g., BCCH_modif_period=C_eDRX·(BCCH_modif_period_for_normal_DRX).

According to aspects of the present disclosure, modification period boundaries for eDRX UEs may be aligned with modification period boundaries of normal (e.g., legacy) DRX UEs. The BCCH modification period for eDRX UEs may be constrained to be integral multiples of the BCCH modification period of normal (e.g., legacy) DRX UEs. When using this technique, an eNB may ensure that any system information change that could impact both normal (e.g., legacy) DRX UEs and eDRX UEs is only scheduled at the aligned boundaries for the normal (e.g., legacy) DRX UEs and the eDRX UEs.

In some cases, changes to system information parameters are time critical for normal DRX UEs, while having minimal or no affect on the operation of eDRX UEs. That is, for certain system information parameters, changes to the parameters should be made as soon as possible to support efficient operation of normal DRX UEs, while having minimal or no impact on eDRX UEs. For these system information parameters, an eNB operating with eDRX UEs and normal (e.g., legacy) DRX UEs may update the parameters without waiting (e.g., as previously described) for an eDRX UE BCCH modification period. The eNB may modify the system information parameters at a normal DRX UE BCCH modification boundary, so that normal DRX UEs can be paged to acquire the updated system information. The paged UEs then wake up and acquire (e.g., receive in a system information block (SIB)) the updated system information, as previously described.

According to aspects of the present disclosure, an eNB may indicate in a paging message to an eDRX UE that the eNB has updated system information (e.g., system information parameters). An eDRX UE receiving a page indicating that the eNB has updated system information may wake up and begin attempts to acquire the system information. An eNB may indicate the eNB has updated system information in a paging message when the eNB has updated system information without waiting for an eDRX BCCH modification boundary, as described above. By updating system information without waiting for an eDRX BCCH modification boundary, the eNB may more efficiently support normal (e.g., legacy) DRX UEs.

Figure 8:
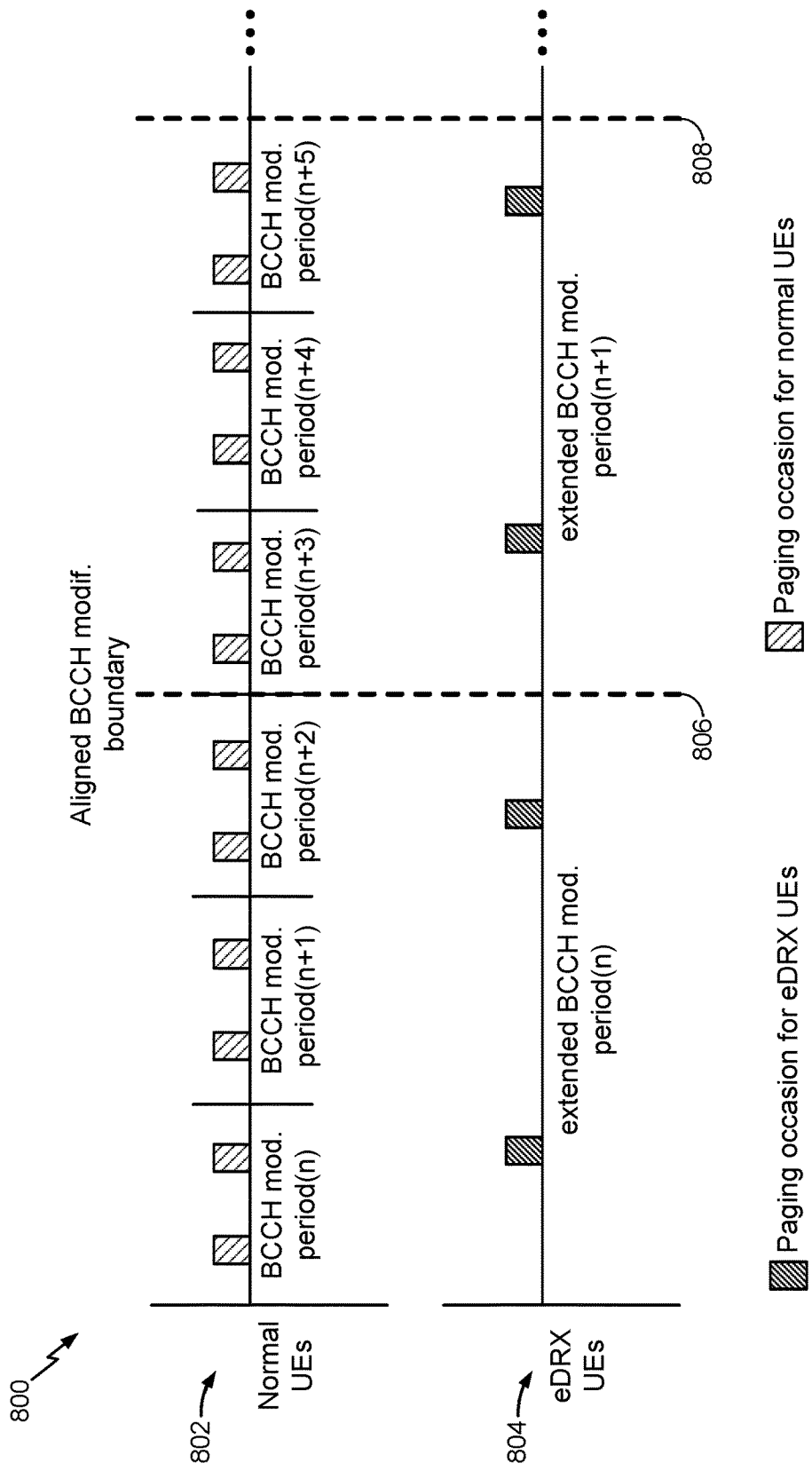
FIG. 8 illustrates exemplary timelines for normal (e.g., legacy) DRX UEs and eDRX UEs, in accordance with certain aspects of the present disclosure.

FIG. 8 illustrates exemplary timelines 800 for normal (e.g., legacy) DRX UEs and eDRX UEs. The timeline 802 is for normal (e.g., legacy) DRX UEs, while the timeline 804 is for eDRX UEs. As illustrated, system information modifications that could impact both the normal DRX UEs and the eDRX UEs are scheduled by the eNB at one of the aligned boundaries 806, 808.

Figure 9:
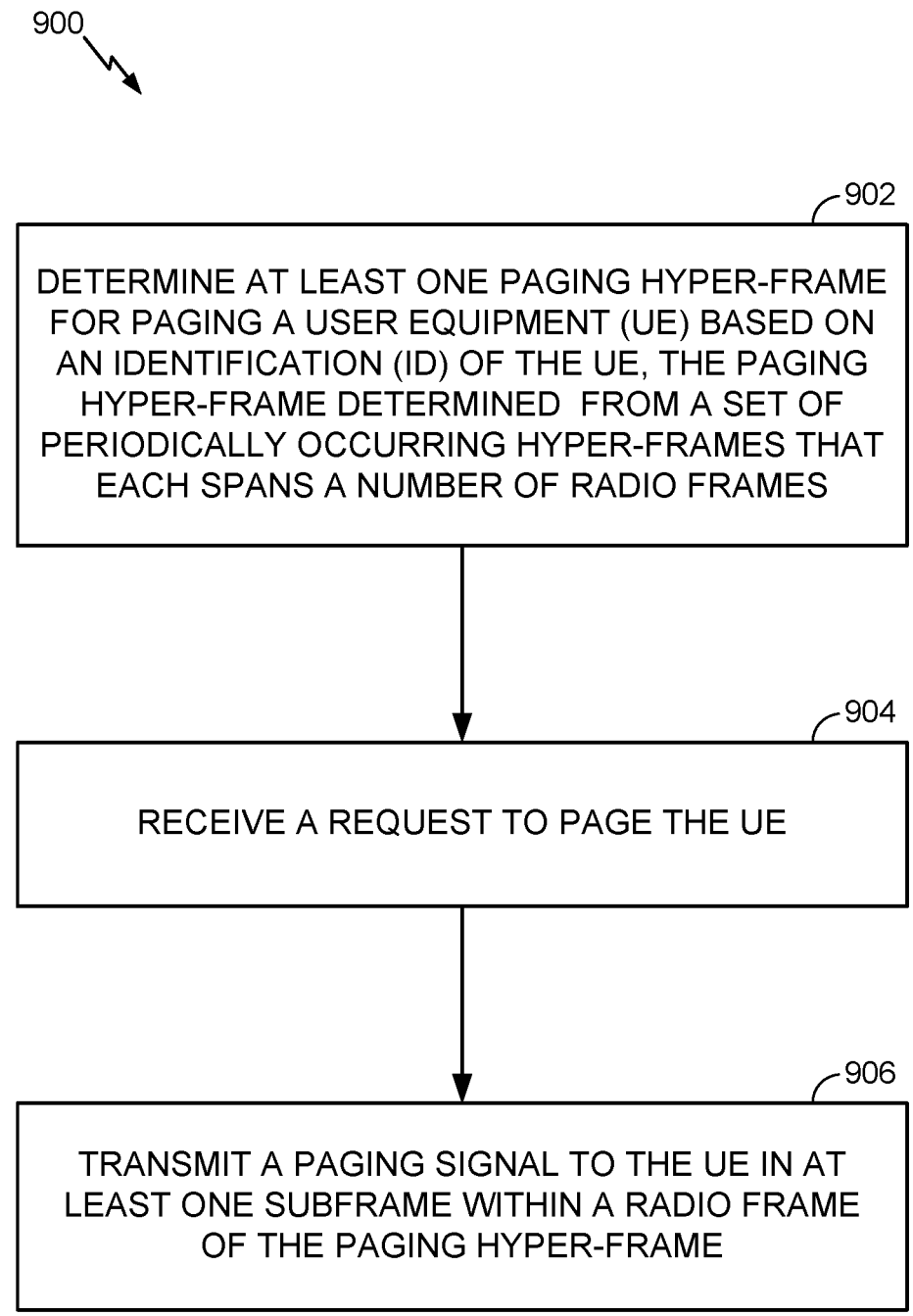
FIG. 9 illustrates exemplary operations that may be performed by a BS, in accordance with certain aspects of the present disclosure.

FIG. 9 illustrates exemplary operations that may be performed by a BS (e.g., BS 110) to operate with UEs performing eDRX as described above, according to certain aspects of the present disclosure.

At block 902, the BS determines at least one paging hyper-frame for paging a user equipment (UE) based on an identification (ID) of the UE, the paging hyper-frame determined from a set of periodically occurring hyper-frames that each spans a number of radio frames. At block 904, the BS receives a request (e.g., from an MME) to page the UE. At block 906, the BS transmits a paging signal to the UE in at least one subframe within a radio frame of the paging hyper-frame.

According to aspects of the present disclosure, the BS may determine the paging hyper-frame based on a period for eDRX of the UE. In some aspects of the present disclosure, transmitting the paging signal in at least one subframe of a paging hyper-frame comprises transmitting a paging signal in a plurality of radio frames of the paging hyper-frame, the plurality of radio frames determined based on the period for a legacy DRX.

According to aspects of the present disclosure, paging hyper-frames for a UE are independent of a base station on which the UE is camping, at least within a tracking area. That is, PHs for a UE within a tracking area occur at H-SFNs that are constant across the tracking area, regardless of a cell on which the UE is camped. For example, PHs for a UE may be determined based on an identifier of the UE.

According to aspects of the present disclosure, paging hyper-frames for the UE from different BSs within a tracking area fall within a paging response window. That is, PHs for a UE within a tracking area all occur within a period of time approximately two hyper-frames long, because the PHs occur in hyper-frames with H-SFN indices that are selected based on the ID of the UE, and each BS within a tracking area restarts numbering of hyper-frames at a time less than two hyper-frames later than every other BS in the tracking area.

Figure 10:
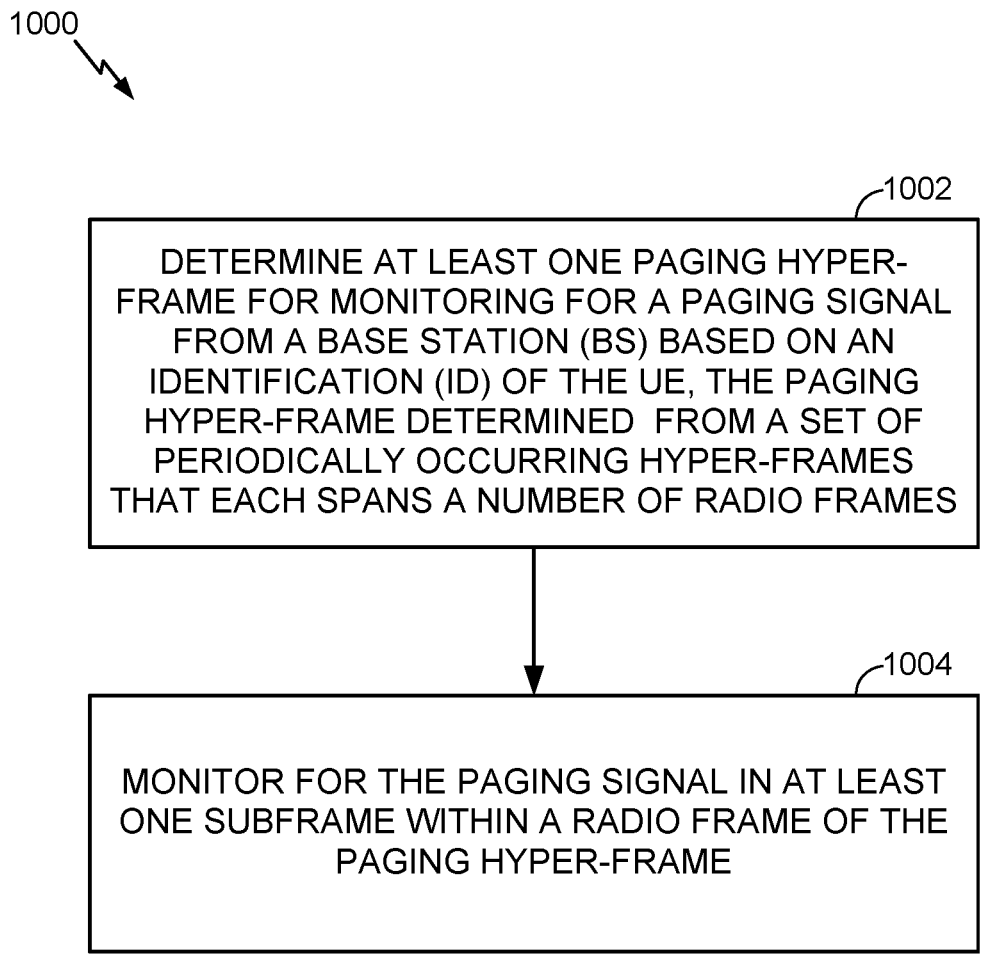
FIG. 10 illustrates exemplary operations that may be performed by a UE, in accordance with certain aspects of the present disclosure.

FIG. 10 illustrates exemplary operations 1000 that may be performed by a UE (e.g., UE 120) operating with eDRX as described above, according to certain aspects of the present disclosure.

At block 1002, the UE determines at least one paging hyper-frame for monitoring for a paging signal from a base station (BS) based on an identification (ID) of the UE, the paging hyper-frame determined from a set of periodically occurring hyper-frames that each spans a number of radio frames. At block 1004, the UE monitors for the paging signal in at least one subframe within a radio frame of the paging hyper-frame.

Figure 11:
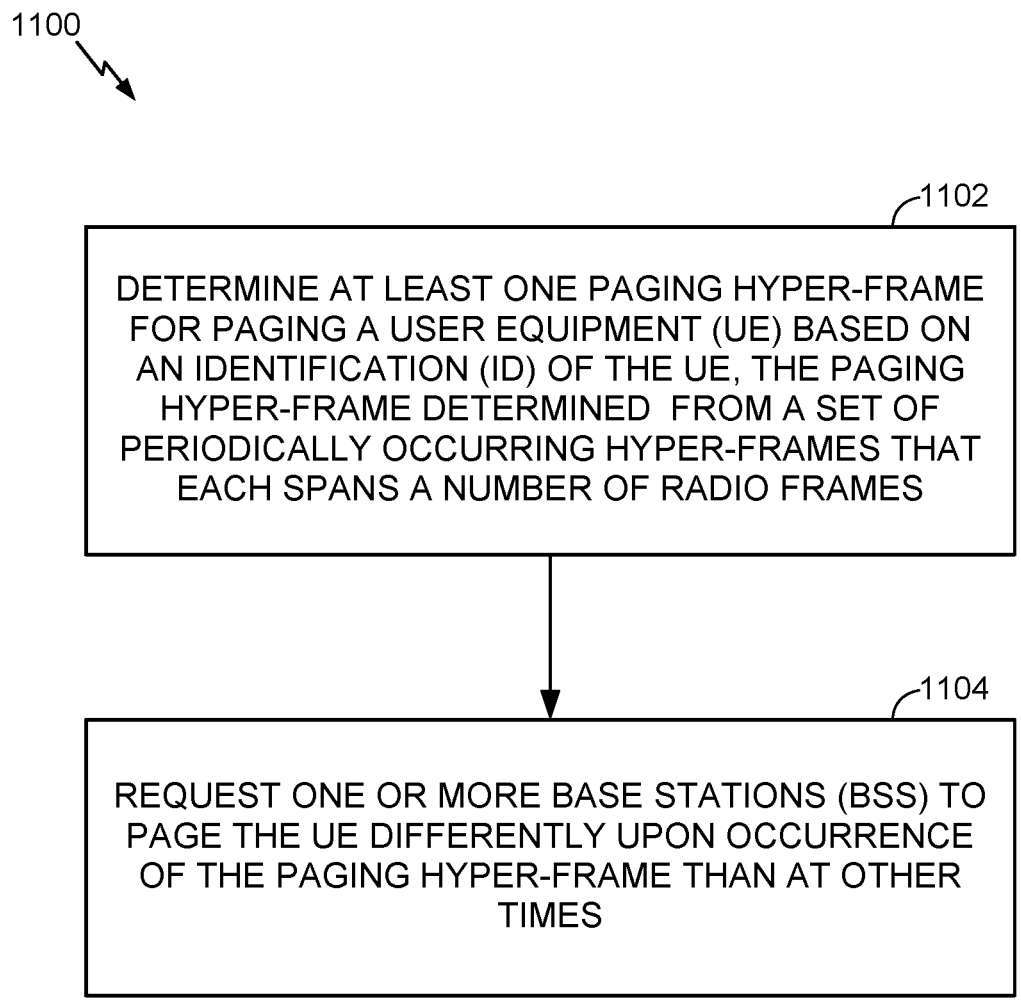
FIG. 11 illustrates exemplary operations that may be performed by a network entity, in accordance with certain aspects of the present disclosure.

FIG. 11 illustrates exemplary operations 1100 that may be performed by a network entity (e.g., an MME or network controller 130) for operating with UEs using eDRX as described above, according to certain aspects of the present disclosure.

At block 1102, the network entity determines at least one paging hyper-frame for paging a user equipment (UE) based on an identification (ID) of the UE, the paging hyper-frame determined from a set of periodically occurring hyper-frames that each spans a number of radio frames. At block 1104, the network entity requests one or more base stations (BSs) to page the UE differently upon occurrence of the paging hyper-frame than at other times.

Example Unsynchronized Paging in Extended Discontinuous Reception

As mentioned above, when operating with UEs performing extended discontinuous reception (eDRX), it may be desirable to have a rough synchronization between BSs of a network, e.g., to improve reliability of the pages of the network reaching a paged UE performing eDRX. According to aspects of the present disclosure, BSs of a network may perform unsynchronized paging while operating with UEs performing eDRX.

When a UE is performing eDRX, it is desirable for BSs of a network to be roughly synchronized in order to prevent a mobile UE from missing pages. In certain circumstances, a UE performing eDRX that the network is paging could move from a coverage area of a first BS just before the first BS pages the UE. If a second BS serving the coverage area that the UE entered has sent the page shortly before the UE enters the coverage area, then the UE misses the pages from both the first BS and second BS. If this occurs, then the UE could conceivably be unreachable for more than the duration of the configured eDRX cycle of the UE.

Figure 12:
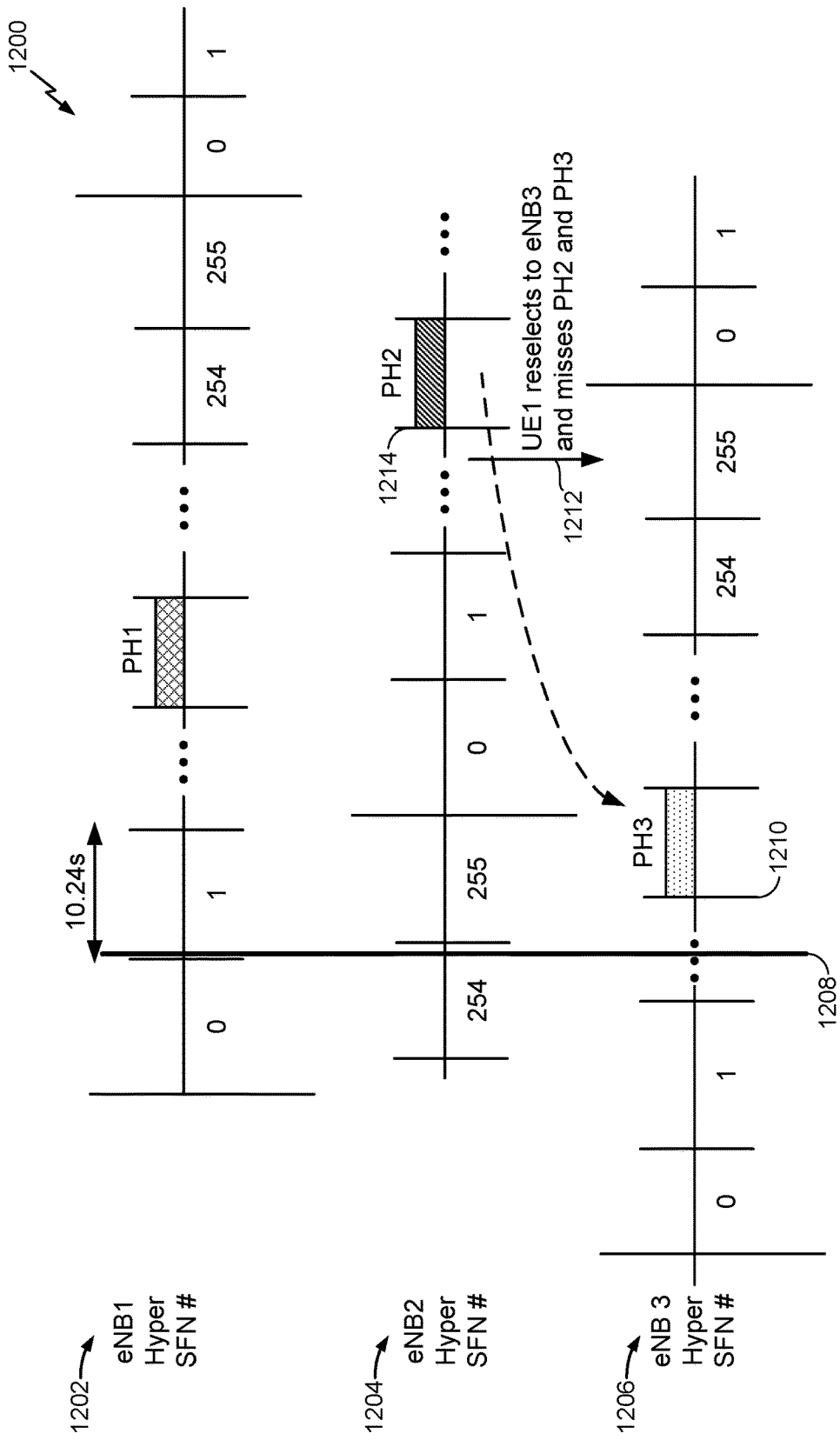
FIG. 12 illustrates exemplary timelines of eNBs supporting a UE operating with eDRX, in accordance with certain aspects of the present disclosure.

FIG. 12 illustrates the above described situation with exemplary timeline 1200. Exemplary eDRX paging cycles for eNB1, eNB2, and eNB3 are shown at 1202, 1204, and 1206, respectively. As illustrated, the eDRX paging cycles for eNB1, eNB2, and eNB3 are unsynchronized. At 1208, the network determines to page UE1 and sends paging commands to eNB1, eNB2, and eNB3. In the exemplary timeline, UE1 is being served by eNB2. eNB3 pages UE1 during the paging hyper-frame PH3 of eNB3 at 1210, but UE1 is not currently being served by eNB3, so UE1 does not detect the page from eNB3. At 1212, UE1 reselects from eNB2 to eNB3. At 1214, the paging hyper-frame PH2 of eNB2 occurs, and eNB2 pages UE1. Because UE1 already reselected to eNB3, UE1 does not detect the pages from eNB2. As the paging hyper-frame for eNB3 occurred earlier, at 1210, UE1 has missed the paging hyper-frames from both eNB2 and eNB3. If UE1 remains in the coverage area of eNB3, then UE1 will not be reachable by the network until the next occurrence of PH3, and will have been unreachable for longer than the duration of the eDRX cycle.

In other circumstances, a UE may receive a page from a first BS, respond to the page, and then move out of the coverage area of the first BS. If a second BS serving the coverage area that the UE entered sends the same page to the UE after the UE enters the coverage area, then the UE may respond to the page from the second BS, resulting in unnecessary signaling as the UE responds to the same page twice. Having the BSs of a network be roughly synchronized may prevent this situation from occurring.

Figure 13:
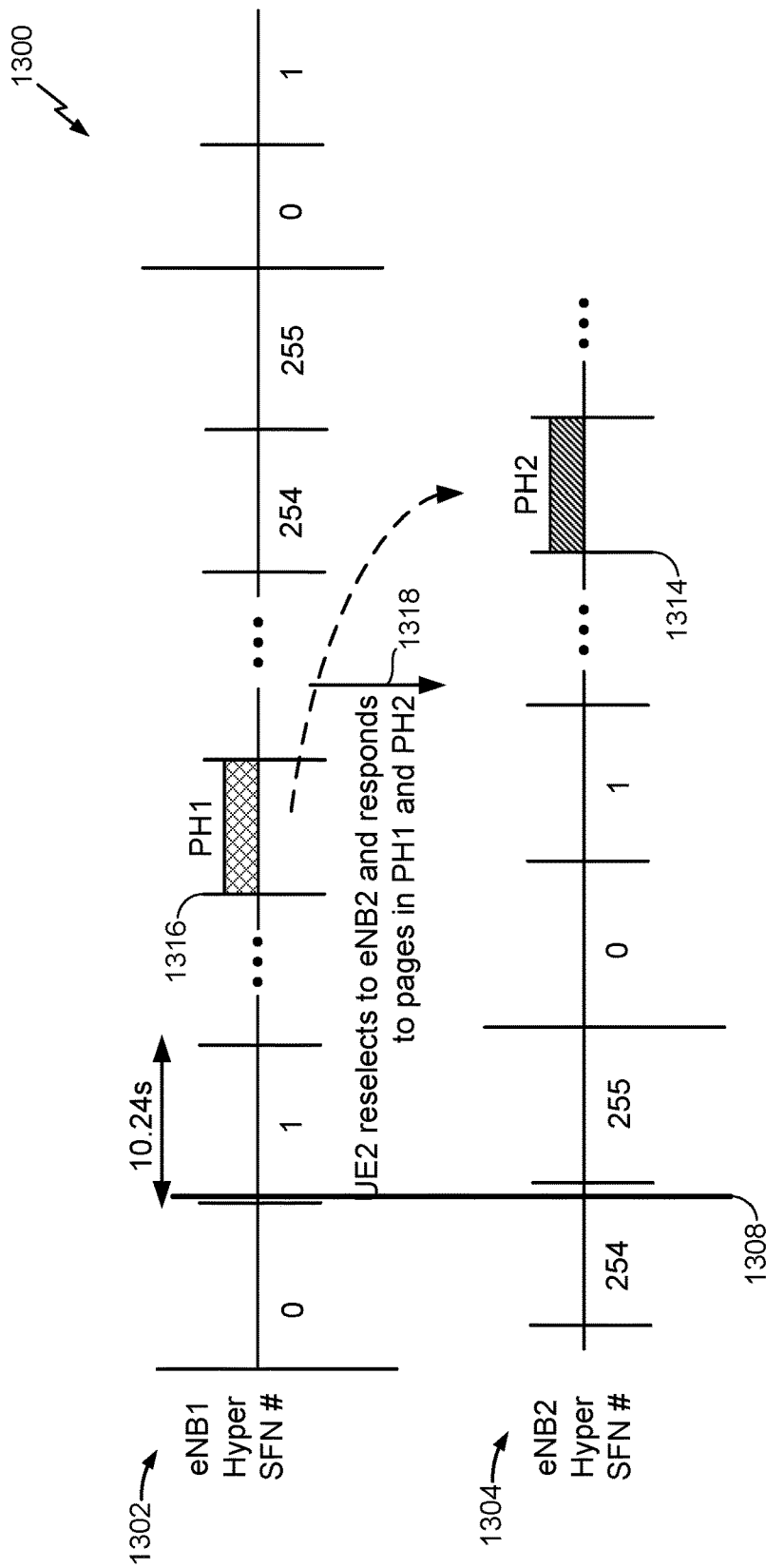
FIG. 13 illustrates exemplary timelines of eNBs supporting a UE operating with eDRX, in accordance with certain aspects of the present disclosure.

FIG. 13 illustrates the above described situation with exemplary timeline 1300. Exemplary eDRX paging cycles for eNB1 and eNB2 are shown at 1302 and 1304, respectively. At 1308, the network determines that there is data for UE2, determines to page UE2, and sends paging commands to eNB1, eNB2, and eNB3. In the exemplary timeline, UE2 is being served by eNB1. eNB1 pages UE2 during the paging hyper-frame PH1 of eNB1 at 1316. UE2 detects and responds to the page(s) from eNB1 and receives the data via eNB1. At 1318, UE1 reselects from eNB1 to eNB2. At 1314, the paging hyper-frame PH2 of eNB2 occurs, and eNB2 pages UE2. UE2 may respond to the page from eNB2 and then receive via eNB2 the same data that UE2 received via eNB1. If this occurs, then the paging by eNB2, the response by UE2, and the data transfer from eNB2 are all unnecessary signaling.

According to aspects of the present disclosure, a UE performing eDRX in a network where BSs are not synchronized may use an eDRX page monitoring timer, $T_{monitor,eDRX}$, to avoid the undesirable situations where the UE misses pages (e.g., UE1) or unnecessary signaling occurs because the UE responds to pages from multiple BSs (e.g., UE2), as described above with reference to FIG. 12.

According to aspects of the present disclosure, an MME may configure a UE performing eDRX to use an eDRX page monitoring timer (e.g., $T_{monitor,eDRX}$) and a DRX page monitoring timer (e.g., $T_{monitor,DRX}$). An MME may configure a UE performing eDRX to use an eDRX page monitoring timer (e.g., $T_{monitor,eDRX}$) and configure the duration that the eDRX page monitoring timer may run before expiring. That is, the MME may configure a UE performing eDRX with a maximum period of time for an eDRX page monitoring timer to run before the UE takes some action (e.g., monitoring for another paging signal in one or more radio frames that are not within the paging hyper-frame, triggering a non-access stratum (NAS) procedure, triggering a radio resource control (RRC) procedure) in response to the expiration of the eDRX page monitoring timer. An MME may also configure the duration that the DRX page monitoring timer may run before expiring.

Alternatively to being configured by the MME, the value of one or both timers ($T_{monitor,eDRX}$ and $T_{monitor,DRX}$) may be either specified or derived implicitly, e.g., based on other eDRX parameters already configured by the network.

According to aspects of the present disclosure, a UE performing eDRX and using an eDRX page monitoring timer may start (e.g., restart) the eDRX page monitoring timer on every occasion where the UE successfully monitors a paging occasion (e.g., receiving a page or being able to monitor the designated paging occasion for a potential page). Multiple page repetitions within a same paging hyper-frame may be treated as a single paging occasion by the UE.

A UE performing eDRX and using an eDRX page monitoring timer may also start (e.g., restart) the eDRX page monitoring timer on every occasion where the UE completes a radio resource control (RRC) or non-access stratum (NAS) procedure and returns to an idle state.

According to aspects of the present disclosure, if an eDRX page monitoring timer of a UE performing eDRX expires, the UE may fall back to performing legacy DRX for a period of time equal to the duration of a DRX page monitoring timer (e.g., 20 seconds). After performing legacy DRX (e.g., monitoring for pages on the UE's legacy DRX cycle) for the duration of the DRX page monitoring timer, the UE may return to performing eDRX and restart the eDRX page monitoring timer.

According to aspects of the present disclosure, if an eDRX page monitoring timer of a UE performing eDRX expires, the UE may trigger a NAS or RRC procedure (e.g., a tracking area update (TAU), a service request (SR), or an RRC connection request). After performing the NAS or RRC procedure, the UE may return to performing eDRX and restart the eDRX page monitoring timer.

According to aspects of the present disclosure, when a UE performing eDRX does not respond to a page request within a time period close to the eDRX cycle of the UE (e.g., UE's eDRX cycle plus two seconds or UE's eDRX cycle plus 100 milliseconds), an MME may instruct one or more BSs (e.g., all of the BSs in a tracking area) to page the UE in legacy DRX mode.

Figure 14:
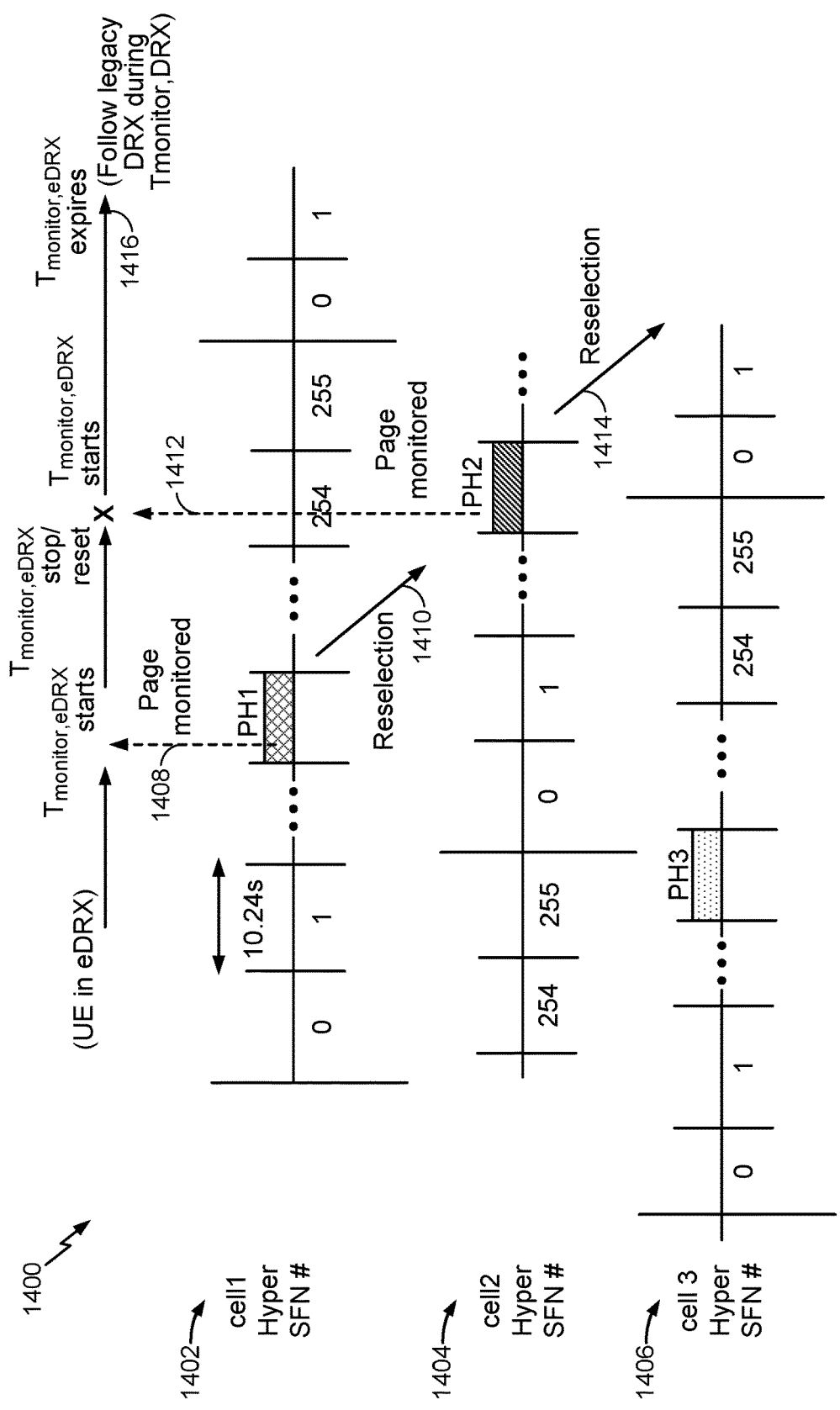
FIG. 14 illustrates exemplary timelines of eNBs supporting a UE operating with eDRX, in accordance with certain aspects of the present disclosure.

FIG. 14 illustrates, in exemplary timeline 1400, exemplary operations that may be performed by a UE performing eDRX in a network where the BSs are not synchronized with respect to their paging hyper-frame cycles, in accordance with aspects of the present disclosure. Exemplary eDRX paging cycles for cell1, cell2, and cell3 are shown at 1402, 1404, and 1406, respectively. At 1408, a UE performing eDRX that is being served by cell1 is able to monitor for pages in paging hyper-frame PH1 of cell1'. As previously described, the UE restarts an eDRX page monitoring timer (e.g., $T_{monitor,eDRX}$) in response to successfully monitoring for pages. At 1410, the UE reselects to cell2. At 1412, the UE monitors for pages in paging hyper-frame PH2 of cell2. As previously described, the UE restarts (e.g., stops and resets) the eDRX page monitoring timer (e.g., $T_{monitor,eDRX}$) of the UE in response to the UE successfully monitoring for pages. At 1414, the UE reselects to cell3. At 1416, the eDRX page monitoring timer (e.g., $T_{monitor,eDRX}$) of the UE expires before the UE is able to monitor for pages from cell3. As previously described, the UE falls back to monitoring for legacy DRX pages and starts a DRX page monitoring timer (e.g., $T_{monitor,DRX}$) in response to the eDRX page monitoring timer (e.g., $T_{monitor,eDRX}$) of the UE expiring. The UE may return to performing eDRX and restart the eDRX page monitoring timer when the DRX page monitoring timer expires.

According to aspects of the present disclosure, a UE performing eDRX may respond to a page from a cell and then, in response to responding to the page, ignore paging for a period of time. A UE that ignores paging for a period of time in this situation may avoid responding to pages from different BSs that were triggered from the same initial request from a network entity (e.g., an MME). According to aspects of the present disclosure, the period of time for a UE to ignore pages may be configured on the UE as part of an eDRX configuration supplied to the UE by a network entity. Additionally or alternatively, the period of time for a UE to ignore pages may be dynamically signaled (e.g., as part of a service request (SR) procedure) to the UE from a network entity via a BS. Also additionally or alternatively, the period of time for a UE to ignore pages may be a default or implicit value determined based on the eDRX cycle (e.g., the length of the eDRX cycle) that the UE is configured with.

According to aspects of the present disclosure, once the UE responds to a page, the MME may send a page cancellation notification to the BSs (e.g., eNBs) in the tracking area. Upon reception of the notification, the BSs (e.g., eNBs) cancel any pending pages for the UE. By cancelling the page transmission, the above mentioned issue of a UE responding to duplicate pages can be avoided.

Alternatively, or additionally, a network entity (e.g., an MME) may include a first tag or sequence number in a page request to a base station. A UE performing eDRX may respond to a page from a cell containing the first tag or sequence number and subsequently ignore paging signals containing the same first tag or sequence number. A UE may stop ignoring paging signals if the UE receives a paging signal containing a second tag or sequence number.

According to aspects of the present disclosure, a network entity (e.g., an MME) may determine a time period that the network entity will wait between pages to a UE performing eDRX triggered by the network entity. That is, a network entity that has triggered a page to a UE performing eDRX will wait for a period of time before triggering another page to the UE. The network entity may determine the length of the period of time based on a period of time that the UE will ignore pages, as described above.

The various techniques presented herein may improve the time associated with performing cell acquisition and, as a result, improve device performance and/or reduce power consumption.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for boosting, means for configuring, means for reducing, means for exiting, means for requesting, means for coordinating, means for performing, means for monitoring, means for searching, means for terminating, means for returning, means for instructing, and/or means for indicating may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna(s) 252 of the user terminal 120 illustrated in FIG. 2. Means for transmitting, and/or means for announcing, may comprise a transmit processor (e.g., the transmit processor 220) and/or an antenna(s) 234 of the eNB 110 illustrated in FIG. 2. Means for requesting and/or means for instructing may include a network interface, one or more processors, and/or a communications unit (e.g., communications unit 294 or communications unit 244).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communications by a base station (BS), comprising:
   determining at least one paging hyper-frame for paging a user equipment (UE) based on an identification (ID) of the UE, the at least one paging hyper-frame determined from a set of periodically occurring hyper-frames that each spans a number of radio frames, wherein paging hyper-frames for the UE, from different BSs within a tracking area and not operating synchronously, fall within a paging response window;
   receiving a request to page the UE; and
   transmitting a paging signal to the UE in at least one subframe within a radio frame of the paging hyper-frame.

2. The method of claim 1, wherein the at least one paging hyper-frame is also determined based on a period for extended discontinuous reception (eDRX) of the UE.

3. The method of claim 2, wherein transmitting the paging signal in at least one subframe of the paging hyper-frame comprises:
   transmitting the paging signal or another paging signal in each of a plurality of radio frames of the paging hyper-frame, the plurality of radio frames determined based on a period for legacy discontinuous reception (DRX) of the UE.

4. The method of claim 3, wherein a same paging signal is transmitted in each radio frame of the plurality of radio frames.

5. The method of claim 2, wherein the at least one paging hyper-frame comprises a plurality of paging hyper-frames, each determined based on the period for eDRX.

6. The method of claim 1, further comprising:
   receiving a request, from a network entity, to cancel paging of the UE after transmitting the paging signal; and
   canceling transmission of additional paging signals in response to the request.

7. The method of claim 1, further comprising:
   determining to update system information for a cell that supports eDRX UEs;
   determining an extended broadcast control channel (BCCH) modification period for UEs in eDRX; and
   updating the system information within one extended BCCH modification period of transmitting the paging signal to the UE.

8. The method of claim 7, further comprising determining an extended BCCH modification boundary that is time-aligned with a normal BCCH modification boundary.

9. The method of claim 1, wherein:
   paging hyper-frames for the UE are independent of a base station on which the UE is camping, at least within a tracking area.

10. The method of claim 1, further comprising initializing a hyper-frame system frame number (H-SFN) to align with a global clock to synchronize the paging response window with another base station in the tracking area.

11. The method of claim 1, further comprising:
    indicating, via the paging signal, a change in system information has occurred.

12. The method of claim 1, wherein:
    the request comprises a tag number; and
    transmitting the paging signal comprises transmitting the tag number with the paging signal.

13. A method of wireless communications by a user equipment (UE), comprising:
    determining at least one paging hyper-frame for monitoring for a paging signal from a base station (BS) based on an identification (ID) of the UE, the paging hyper-frame determined from a set of periodically occurring hyper-frames that each spans a number of radio frames; and
    monitoring for the paging signal in at least one subframe within a radio frame of the paging hyper-frame;
    receiving the paging signal; and
    refraining from monitoring for the paging signal during a duration subsequent to receiving the paging signal.

14. The method of claim 13, wherein the paging hyper-frame is also determined based on a period for extended discontinuous reception (eDRX) of the UE.

15. The method of claim 14, wherein monitoring for the paging signal in at least one subframe of the paging hyper-frame comprises:
    monitoring for the paging signal in a plurality of radio frames of the paging hyper-frame, the plurality of radio frames determined based on a period for legacy discontinuous reception (DRX) of the UE.

16. The method of claim 14, wherein the at least one paging hyper-frame comprises a plurality of paging hyper-frames, each determined based on the period for eDRX.

17. The method of claim 13, wherein:
    paging hyper-frames for the UE are independent of a base station on which the UE is camping, at least within a tracking area.

18. The method of claim 13, wherein:
    paging hyper-frames for the UE from different BSs within a tracking area fall within a paging response window.

19. The method of claim 13, further comprising:
    receiving, via the paging signal, an indication that system information has changed; and acquiring the system information in response to the indication.

20. The method of claim 13, further comprising:
starting a timer; and
if the UE is not able to monitor for the paging signal before the expiration of the timer, monitoring for another paging signal in one or more radio frames that are not within the paging hyper-frame.

21. The method of claim 20, further comprising:
restarting the timer if the UE performs at least one of:
monitoring for the paging signal; and
receiving the paging signal or the other paging signal.

22. The method of claim 13, further comprising:
starting a timer; and
if the UE is not able to monitor for the paging signal before the expiration of the timer, triggering a non-access stratum (NAS) procedure.

23. The method of claim 22, further comprising:
restarting the timer if the UE completes the NAS procedure.

24. The method of claim 13, further comprising:
starting a timer; and
if the UE is not able to monitor for the paging signal before the expiration of the timer, triggering a radio resource control (RRC) procedure.

25. The method of claim 24, further comprising:
restarting the timer if the UE completes the RRC procedure.

26. The method of claim 13, further comprising:
starting a timer of the duration.

27. The method of claim 13, wherein an indication of the duration is received in at least one of:
an extended discontinuous reception (eDRX) configuration, and
dynamic signaling.

28. The method of claim 13, further comprising:
determining the duration based on an extended discontinuous reception (eDRX) configuration.

29. The method of claim 13, further comprising:
determining a tag number included in the paging signal; and
ignoring other paging signals including the same tag number.

30. A method of wireless communications by a network entity, comprising:
determining at least one paging hyper-frame for paging a user equipment (UE) based on an identification (ID) of the UE, the paging hyper-frame determined from a set of periodically occurring hyper-frames that each spans a number of radio frames;
requesting one or more base stations (BSs) to page the UE differently upon occurrence of the paging hyper-frame than at other times;
determining that the UE has responded to a page; and
refraining from requesting one or more base stations (BSs) to page the UE during a duration in response to determining that the UE has responded to the page.

31. The method of claim 30, wherein the requesting comprises waiting upon occurrence of the paging hyper-frame to issue a page retransmission request for another page request sent to the one or more BSs during one of the other times.

32. The method of claim 30, wherein:
paging hyper-frames for the UE from different BSs within a tracking area fall within a paging response window.

33. The method of claim 30, wherein the requesting comprises paging the UE more frequently in conjunction with the paging hyper-frame relative to how the UE is paged at the other times.

34. The method of claim 30, wherein the paging hyper-frame is also determined based on a period for extended discontinuous reception (eDRX) of the UE.

35. The method of claim 34, wherein the at least one paging hyper-frame comprises a plurality of paging hyper-frames, each determined based on the period for eDRX.

36. The method of claim 30, further comprising:
transmitting a request, to one or more base stations (BSsl, to cancel paging of the UE in response to determining that the UE has responded to the page.

37. The method of claim 30, wherein:
paging hyper-frames for the UE are independent of a base station on which the UE is camping, at least within a tracking area.

38. The method of claim 30, further comprising:
determining that the UE has not responded to another page within a period of time; and
instructing one or more base stations (BSs) to page the UE outside of the paging hyper-frame.

39. The method of claim 30, further comprising:
starting a timer of the duration in response to determining that the UE has responded to the page.

40. The method of claim 30, further comprising:
sending a paging cancellation for the UE to one or more base stations in response to determining that the UE has responded to the page.

41. The method of claim 30, further comprising:
determining a tag number to be included in a page, wherein the requesting comprises sending the tag number to the one or more BSs.

42. An apparatus for wireless communications, comprising:
means for determining at least one paging hyper-frame for paging a user equipment (UE) based on an identification (ID) of the UE, the paging hyper-frame determined from a set of periodically occurring hyper-frames that each spans a number of radio frames, wherein paging hyper-frames for the UE, from different BSs within a tracking area and not operating synchronously, fall within a paging response window;
means for receiving a request to page the UE; and
means for transmitting a paging signal to the UE in at least one subframe within a radio frame of the paging hyper-frame.

43. An apparatus for wireless communications, comprising:
means for determining at least one paging hyper-frame for monitoring for a paging signal from a base station (BS) based on an identification (ID) of a UE, the paging hyper-frame determined from a set of periodically occurring hyper-frames that each spans a number of radio frames;
means for monitoring for the paging signal in at least one subframe within a radio frame of the paging hyper-frame;
means for receiving the paging signal; and
means for causing the apparatus to refrain from monitoring for the paging signal during a duration subsequent to the apparatus receiving the paging signal.

44. An apparatus for wireless communications, comprising:
means for determining at least one paging hyper-frame for paging a user equipment (UE) based on an identification (ID) of the UE, the paging hyper-frame determined from a set of periodically occurring hyper-frames that each spans a number of radio frames;

means for requesting one or more base stations (BSs) to page the UE differently upon occurrence of the paging hyper-frame than at other times; and means for determining that the UE has responded to a page; and means for causing the apparatus to refrain from requesting one or more base stations (BSs) to page the UE during a duration in response to determining that the UE has responded to the page.

45. A base station (BS), comprising:
at least one antenna; and
at least one processor configured to:
  determine at least one paging hyper-frame for paging a user equipment (UE) based on an identification (ID) of the UE, the paging hyper-frame determined from a set of periodically occurring hyper-frames that each spans a number of radio frames, wherein paging hyper-frames for the UE, from different BSs within a tracking area and not operating synchronously, fall within a paging response window,
  receive a request to page the UE, and
  transmit a paging signal, via the at least one antenna, to the UE in at least one subframe within a radio frame of the paging hyper-frame.

46. A user equipment (UE), comprising:
at least one antenna; and
a processor configured to:
  determine at least one paging hyper-frame for monitoring for a paging signal from a base station (BS) based on an identification (ID) of the UE, the paging hyper-frame determined from a set of periodically occurring hyper-frames that each spans a number of radio frames, and
  monitor for the paging signal in at least one subframe within a radio frame of the paging hyper-frame;
  receive the paging signal during a paging response window; and
  cause the UE to refrain from monitoring for the paging signal during a duration subsequent to receiving the paging signal.

47. A network entity, comprising:
at least one network interface; and
a processor configured to:
  determine at least one paging hyper-frame for paging a user equipment (UE) based on an identification (ID) of the UE, the paging hyper-frame determined from a set of periodically occurring hyper-frames that each spans a number of radio frames, and
  request, via the network interface, one or more base stations (BSs) to page the UE differently upon occurrence of the paging hyper-frame than at other times; and
  determine that the UE has responded to a page; and
  cause the network entity to refrain from requesting one or more base stations (BSs) to page the UE during a duration in response to determining that the UE has responded to the page.

48. A non-transitory computer readable medium comprising computer-executable instructions for:
  determining at least one paging hyper-frame for paging a user equipment (UE) based on an identification (ID) of the UE, the paging hyper-frame determined from a set of periodically occurring hyper-frames that each spans a number of radio frames, wherein paging hyper-frames for the UE, from different BSs within a tracking area and not operating synchronously, fall within a paging response window;
  receiving a request to page the UE; and
  transmitting a paging signal to the UE in at least one subframe within a radio frame of the paging hyper-frame.

49. A non-transitory computer readable medium comprising computer-executable instructions for:
  determining at least one paging hyper-frame for monitoring for a paging signal from a base station (BS) based on an identification (ID) of a UE, the paging hyper-frame determined from a set of periodically occurring hyper-frames that each spans a number of radio frames; and
  monitoring for the paging signal in at least one subframe within a radio frame of the paging hyper-frame;
  receiving the paging signal during a paging response window; and
  refraining from monitoring for the paging signal during a duration subsequent to receiving the paging signal.

50. A non-transitory computer readable medium comprising computer-executable instructions for:
  determining at least one paging hyper-frame for paging a user equipment (UE) based on an identification (ID) of the UE, the paging hyper-frame determined from a set of periodically occurring hyper-frames that each spans a number of radio frames; and
  requesting one or more base stations (BSs) to page the UE differently upon occurrence of the paging hyper-frame than at other times; and
  determining that the UE has responded to a page; and
  refraining from requesting one or more base stations (BSs) to page the UE during a duration in response to determining that the UE has responded to the page.

\* \* \* \* \*